(12) United States Patent
Shechtman et al.

(10) Patent No.: US 10,748,324 B2
(45) Date of Patent: Aug. 18, 2020

(54) GENERATING STYLIZED-STROKE IMAGES FROM SOURCE IMAGES UTILIZING STYLE-TRANSFER-NEURAL NETWORKS WITH NON-PHOTOREALISTIC-RENDERING

(71) Applicant: Adobe Inc., San Jose, CA (US)

(72) Inventors: Elya Shechtman, Seattle, WA (US); Yijun Li, Merced, CA (US); Chen Fang, Hanover, NH (US); Aaron Hertzmann, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 14 days.

(21) Appl. No.: 16/184,289

(22) Filed: Nov. 8, 2018

(65) Prior Publication Data
US 2020/0151938 A1 May 14, 2020

(51) Int. Cl.
*G06T 15/02* (2011.01)
*G06T 15/80* (2011.01)
(Continued)

(52) U.S. Cl.
CPC ............... *G06T 15/02* (2013.01); *G06N 3/04* (2013.01); *G06N 3/08* (2013.01); *G06T 15/80* (2013.01); *G06T 2200/24* (2013.01)

(58) Field of Classification Search
CPC ..... G06T 15/02; G06T 15/80; G06T 2200/24; G06T 7/13; G06T 2207/20084;
(Continued)

(56) References Cited

U.S. PATENT DOCUMENTS

| | | | |
|---|---|---|---|
| 2013/0120393 A1* | 5/2013 | Winnemoeller | G06T 11/001 345/441 |
| 2019/0026870 A1* | 1/2019 | Hu | G06T 11/00 |
| 2019/0220746 A1* | 7/2019 | Liu | G06N 3/08 |

OTHER PUBLICATIONS

XDoG: An eXtended difference-of-Gaussians compendium including advanced image stylization, Computers & Graphics, vol. 36, Issue No. 6, pp. 720-753 (2012).
(Continued)

*Primary Examiner* — Haixia Du
(74) *Attorney, Agent, or Firm* — Keller Jolley Preece

(57) ABSTRACT

This disclosure relates to methods, non-transitory computer readable media, and systems that integrate (or embed) a non-photorealistic rendering ("NPR") generator with a style-transfer-neural network to generate stylized images that both correspond to a source image and resemble a stroke style. By integrating an NPR generator with a style-transfer-neural network, the disclosed methods, non-transitory computer readable media, and systems can accurately capture a stroke style resembling one or both of stylized edges or stylized shadings. When training such a style-transfer-neural network, the integrated NPR generator can enable the disclosed methods, non-transitory computer readable media, and systems to use real-stroke drawings (instead of conventional paired-ground-truth drawings) for training the network to accurately portray a stroke style. In some implementations, the disclosed methods, non-transitory computer readable media, and systems can either train or apply a style-transfer-neural network that captures a variety of stroke styles, such as different edge-stroke styles or shading-stroke styles.

20 Claims, 16 Drawing Sheets

(51) Int. Cl.
*G06N 3/08* (2006.01)
*G06N 3/04* (2006.01)

(58) Field of Classification Search
CPC ........... G06T 11/00; G06T 2207/10024; G06T 2207/20081; G06N 3/04; G06N 3/08; G06K 9/00416; G06K 9/4604
See application file for complete search history.

(56) References Cited

OTHER PUBLICATIONS

Image-to-Image Translation with Conditional Adversarial Networks, Proceedings of the IEEE Conference on Computer Vision and Pattern Recognition (2017).
Cewu Lu et al., "Combining Sketch and Tone for Pencil Drawing Production," International Symposium on Non-Photorealistic Animation and Rendering (2012).
Leon A. Gatys, Alexander S. Ecker, Matthias Bethge. Texture synthesis using convolutional neural networks. In NIPS, 2015.
Huang Xun, Serge J. Belongie. Arbitrary Style Transfer in Real-Time with Adaptive Instance Normalization. In ICCV, 2017.
Li Yijun, Fang Chen, Yang Jimei, Wang Zhaowen, Lu Xin, Yang Ming-Hsuan. Universal style transfer via feature transforms. In NIPS, 2017.
Simo-Serra Edgar, Iizuka Satoshi, Ishikawa Hiroshi. Mastering sketching: adversarial augmentation for structured prediction. In SIGGRAPH, 2018.
Holger Winnemöller. XDoG: Advanced Image Stylization with eXtended Difference-of-Gaussians. In NPAR, 2011.

\* cited by examiner

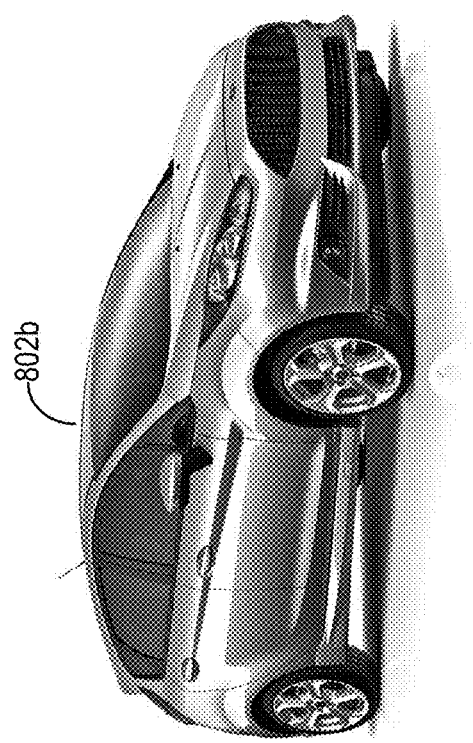
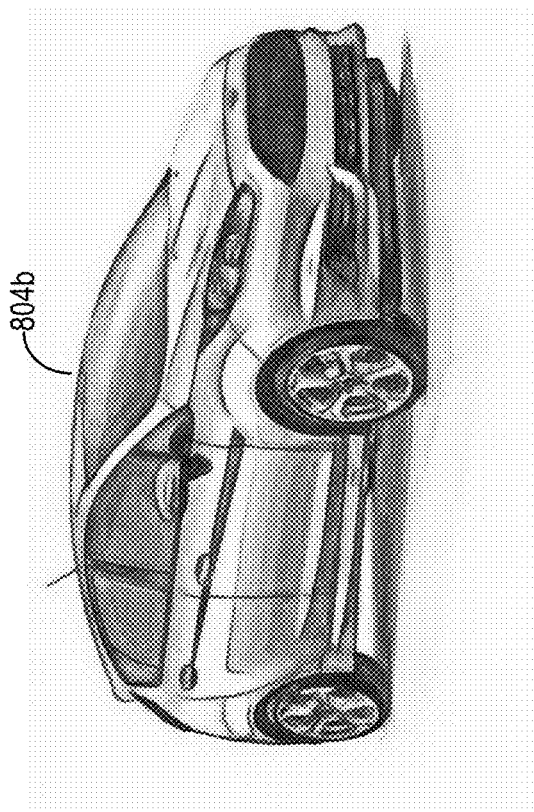
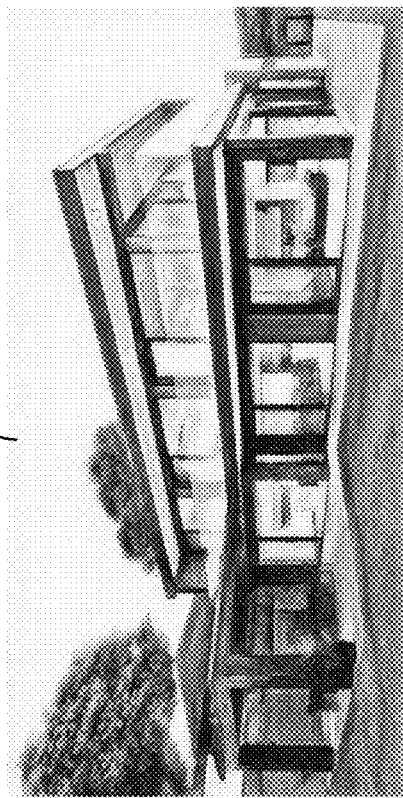
Fig. 8A
Fig. 8B

GENERATING STYLIZED-STROKE IMAGES FROM SOURCE IMAGES UTILIZING STYLE-TRANSFER-NEURAL NETWORKS WITH NON-PHOTOREALISTIC-RENDERING

BACKGROUND

Image-style-conversion systems convert natural or computer-generated images to style-imitation images resembling a drawing or other artwork with hand-drawn strokes. By creating style-imitation images, conventional image-style-conversion systems attempt to generate outputs reflecting the characteristics of an artistic style in ink, pencil, paint, or other medium. Despite advances in generating style-imitation images, certain technical limitations impede conventional image-style-conversion systems from realistically resembling artistic styles, resembling different artistic styles, or applying a neural network that can accurately and consistently imitate artistic strokes.

For example, some conventional image-style-conversion systems cannot currently render style-imitation images that accurately portray an artistic style. In some cases, for instance, conventional image-style-conversion systems generate images that resemble the global black-and-white depictions of a target-drawing style, but fail to capture a stroke style or other artistic marking of the target-drawing style. Some rendering techniques use gradients for input images to render more visible (or obvious) strokes from a target-pencil-drawing style. But such rendering techniques neither render the more visible strokes in a realistic depiction nor render more subtle strokes. Further, some conventional image-style-conversion systems utilize vector lines from an input image to resemble pencil strokes from a target style, but lack the computer engineering to convert natural images to resemble such pencil strokes.

In addition to technical accuracy and imitation problems, in some cases, conventional image-style-conversion systems can intake only certain types of images or generate style-imitation images resembling a specific artistic style. For instance, some conventional image-style-conversion systems can generate (albeit with flawed realism) a particular pencil style, but only when an input image includes distinct lines and does not include natural photography. Conversely, some conventional image-style-conversion systems can only produce images resembling pencil strokes. Such inflexible models limit the artistic styles imitated (and inputs converted).

Independent of technical accuracy or flexibility limitations, conventional image-style-conversion systems often cannot successfully employ neural networks to imitate an artistic style. To train such neural networks, some conventional image-style-conversion systems rely on training images that correspond to conventional paired-ground-truth drawings. But generating such paired-ground-truth drawings can be labor or time intensive and (in some cases) practically impossible. To produce a reasonable level of accuracy in such conventional systems, a human artist may need to hand draw numerous paired-ground-truth drawings in a time-consuming process. The time and cost of creating such paired-ground-truth drawings can prevent computer engineers from reaching a sample size that enables a neural network to train to a point of accurately imitating an artistic style.

SUMMARY

This disclosure describes embodiments of methods, non-transitory computer readable media, and systems that solve the foregoing problems in addition to providing other benefits. For example, in some embodiments, the disclosed systems integrate a non-photorealistic rendering ("NPR") generator with a style-transfer-neural network to generate stylized images that both correspond to a source image and resemble a stroke style both locally and holistically. As explained below, in one or more embodiments, such systems do not require collecting difficult to obtain paired-ground-truth images and drawings. Furthermore, such systems allow for increased flexibility by providing the ability for users to select different styles or combination of styles to be included in a generated stylized image.

For instance, in some embodiments, the disclosed systems use an NPR generator to generate a simplified image of a source image. The systems further extract a feature map from the simplified image using an encoder of a style-transfer-neural network. The systems subsequently decode the feature map using a decoder of the style-transfer-neural network to generate a stylized-stroke image that both corresponds to the source image and exhibits a target stroke style.

The systems can employ an edge style-transfer system to generate images including an edge-stroke style (pencil strokes, charcoal strokes, crayon strokes, ink strokes, woodcut strokes, paint strokes, etc.). Alternatively, the systems can employ a shading style-transfer system to generate images including a shading-stroke style (lines, crossed, smudge, stippling, etc.). In still further embodiments, the systems use multiple style-transfer systems or branches as part of a style fusion transfer system to generate images including multiple fused styles (e.g., both an edge-stroke style and a shading-stroke style).

The following description sets forth additional features and advantages of the disclosed methods, non-transitory computer readable media, and systems, and may make such additional features and advantages obvious or disclose them from the practice of exemplary embodiments.

BRIEF DESCRIPTION OF THE DRAWINGS

The detailed description refers to the drawings briefly described below.

FIGS. 8A and 8B illustrate natural photographs and corresponding style-fusion images generated by the style-transfer system in accordance with one or more embodiments.

DETAILED DESCRIPTION

Figure 1:
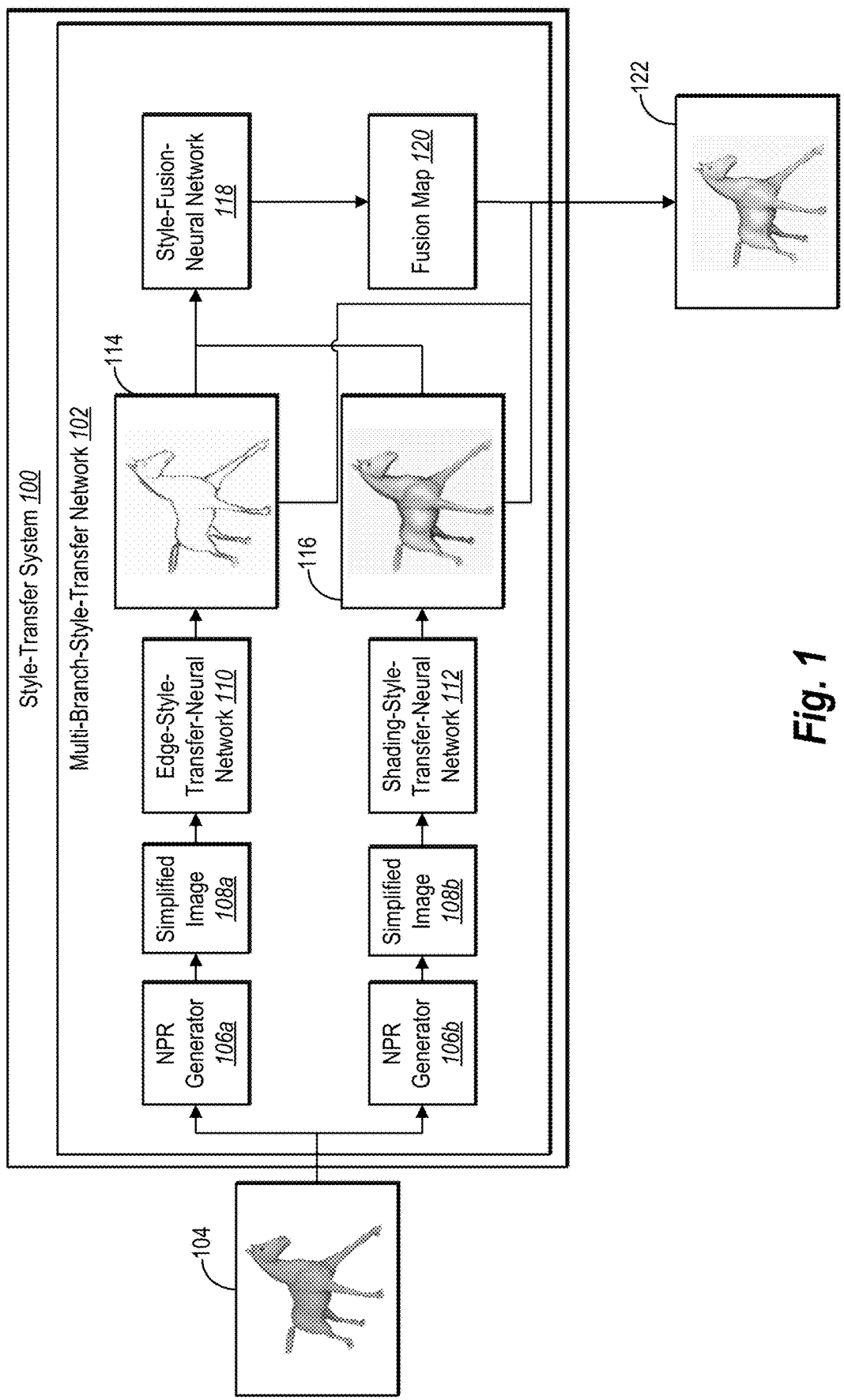
FIG. 1 illustrates a style-transfer system using an edge-style-transfer-neural network to generate a stylized-edge image, a shading-style-transfer-neural network to generate a stylized-shading image, and a style-fusion-neural network to generate a style-fusion image in accordance with one or more embodiments.

This disclosure describes one or more embodiments of a deep-neural-network based style-transfer system that generates stylized images that resemble a stroke style both locally and holistically. More specifically, as described below, one or more embodiments include a deep-neural-network based style-transfer system that accurately produces stylized drawings from natural images or other input images. In one or more implementations, the style-transfer system learns to produce a variety of stroke styles, such as different edge-stroke styles and shading-stroke styles, to allow for a user to select a desired style to be reflected in a generated stylistic image.

As mentioned previously, in order to produce a deep neural network that accurately generates an artistic drawing that reflects a stroke style both locally and holistically, conventional processes would require large numbers of input images and corresponding ground truth artistic drawings of the content of the input images. As noted above, such training pairs are either non-existent or prohibitively costly to produce. One or more embodiments described here comprise deep neural network based style-transfer systems that accurately produce stroke style both locally and holistically in generated drawings/images without the need of such ground truth and input training pairs.

In particular, one or more embodiments include a style-transfer system that integrates a non-photorealistic rendering ("NPR") generator with a neural network. The style-transfer system uses the NPR generators to generate a simplified version of a drawing with a desired artistic style. The style-transfer system then trains a deep neural network to reconstruct the original drawing with the desired artistic style from the simplified version generated by the NPR. In this manner, the style-transfer system is able to train a deep neural network to generate drawings with the desired artistic style without difficult to obtain ground truth and input training pairs.

More particularly, the style-transfer system generates a simplified image of a source image utilizing an NPR generator. The style-transfer system further extracts a feature map from the simplified image using an encoder of a style-transfer-neural network. The style-transfer system subsequently decodes the feature map using a decoder of the style-transfer-neural network to generate a stylized-stroke image that both corresponds to the source image and exhibits a target stroke style. As described below, in some cases, the style-transfer-neural network constitutes an edge-style-transfer-neural network trained to generate stylized-edge images exhibiting an edge-stroke style or a shading-style-transfer-neural network trained to generate stylized-shading images exhibiting a shading-stroke style.

Additionally, or alternatively, in some implementations, the style-transfer system generates a style-fusion image that synthesizes different by using multiple style-transfer-neural networks and a style-fusion-neural network. For example, in some cases, the style-transfer system generates, from a source image, a first simplified image using a first NPR generator and a second simplified image using a second NPR generator. The style-transfer system generates, from the first simplified image, a first stylized image from the first simplified image corresponding to the source image and comprising a first style using a first style-transfer-neural network. The style-transfer system generates, from the second simplified image, a second stylized image from the second simplified image corresponding to the source image and comprising a second style using a second style-transfer-neural network. Having generated two separate stylized images with different styles from a single source image, the style-transfer system further uses a style-fusion-neural network to fuse or combine the two stylized images into a single stylized images that accurately reflects both styles locally and holistically.

More particularly, the style-transfer system further uses a style-fusion-neural network to generate a fusion map for synthesizing the separate stylized images with different styles. For instance, in certain implementations, the style-transfer system uses a first encoder and a second encoder of the style-fusion-neural network to extract a first feature map and a second feature map respectively from each of the stylized images with different styles. The style-transfer system subsequently uses a decoder of the style-fusion-neural network to decode a concatenation of the first and second feature maps and to generate a fusion map. The style-transfer system then generates a style-fusion image comprising by styles by applying the fusion map to combine stylized images with different styles.

As suggested above, in some embodiments, the style-transfer system trains or applies a style-transfer-neural network to generate stylized-stroke images of a variety of stroke styles. For instance, in certain implementations, the style-transfer system receives user input selecting a stroke style (from among multiple stroke styles) and applies a style-transfer-neural network to generate a stylized-stroke image exhibiting the selected stroke style. The style-transfer system may generate stylized-stroke images of multiple different stroke styles upon user selection, such as different edge-stroke styles or different shading-stroke styles.

When training a style-transfer-neural network to generate stylized images, in certain implementations, the style-transfer system generates, using an NPR generator, a simplified-training image from a training image exhibiting a style. The style-transfer system then uses an encoder of a style-transfer-neural network to extract a training-feature map from the simplified-training image. Based on the training-feature map, a decoder of the style-transfer-neural network generates a stylized-sample image exhibiting the style.

Having generated the stylized-sample image, in some embodiments, the style-transfer system determines an adversarial loss from an adversarial-loss function based on a comparison of the stylized-sample image and a real drawing. In some cases, the style-transfer system further determines a reconstruction loss from a reconstruction-loss function based on a comparison of the stylized—sample image and the training image initially provided to the NPR generator. The style-transfer system subsequently adjusts network parameters of the style-transfer-neural network based on one or both of the determined adversarial loss and the determined reconstruction loss.

When training a style-fusion-neural network to generate fusion maps for style-fusion images, in some embodiments, the style-transfer system provides a fusion-stroke-training image exhibiting multiple styles. The style-transfer system uses (i) a first NPR and a first style-transfer-neural network to generate a first stylized-sample image having the first style and (ii) a first encoder of the style-fusion-neural network to extract a first training-feature map from the first stylized-sample image. The style-transfer system uses (i) a second NPR and a second style-transfer-neural network to generate a second stylized-sample image having the second style and (ii) a second encoder of the style-fusion-neural network to extract a second training-feature map from the second stylized-sample image. Having extracted training-feature maps, in certain implementations, the style-transfer system concatenates the first and second training-feature maps and decodes a concatenated-training-feature map with a decoder of the style-fusion-neural network. By decoding the concatenated-training-feature map, the style-transfer system generates a training-fusion map for synthesizing the styles from the first and second stylized-sample images. Based on the training-fusion map, the style-transfer system further generates a style-fusion-sample image comprising both of the first and second styles. The style-transfer system subsequently determines one or both of an adversarial loss and a reconstruction loss as a basis for adjusting network parameters of the style-fusion-neural network.

The disclosed style-transfer system overcomes several technical deficiencies that hinder conventional image-style-conversion systems. In particular, the style-transfer system improves upon the accuracy and realism with which existing image-style-conversion systems generate images exhibiting a target-stroke style. By integrating an NPR generator with a style-transfer-neural network, the style-transfer system can input a source image and output stylized-stroke images corresponding to the source image that realistically portray stylistic edge strokes or stylistic shading strokes. In generating such stylized-stroke images, the style-transfer system can depict a natural image or computer-generated image in an output image that realistically resembles strokes of a particular edge or shading style. Unlike conventional image-style-conversion systems that can only capture global light contrasts and more visible strokes, the style-transfer system can capture both broader strokes of a target-stroke style and subtler strokes of edges and shading.

In addition to more realistically portraying stroke styles, in some embodiments, the style-transfer system also more realistically synthesizes images of multiple stroke styles into a style-fusion image. Some existing image-style-conversion systems superimpose images of multiple artistic styles to generate an unrealistic-looking superimposition of those styles. By contrast, the style-transfer system can use a style-fusion-neural network to more realistically synthesizes stroke styles from multiple stylized-stroke images.

Additionally, the style-transfer system provides increased flexibility relative to existing image-style-conversion systems. For instance, unlike some image-style-conversion systems limited to a particular set of input images, the style-transfer system can intake natural photographs, drawings, or a variety of other input images and then output a stylized image resembling a stroke style. Conversely, unlike some image-style-conversion systems with a fixed output style, the style-transfer system can selectively output one of, or a combination of, multiple styles. Indeed, due to robust training methods described below, a single style-transfer system can generate stylized-stroke images exhibiting different stroke styles.

Furthermore, the style-transfer system introduces a technology for training a neural network with an NPR generator that obviates reliance on ground-truth drawings paired with input-training images. As suggested above, conventional image-style-conversion systems may rely on human artists to draw paired-ground-truth drawings in a time consuming and laborious process. In contrast to the conventional ground-truth images, in some embodiments, the style-transfer system can exploit an integrated NPR generator to train a style-transfer-neural network with real-stroke drawings and stroke-training images exhibiting a target-stroke style. In some such embodiments, the style-transfer system uses a discriminator-neural network to distinguish between a stroke-training image and a real-stroke drawing to determine an adversarial loss as a basis for updating network parameters. Similarly, the style-transfer system can further use style-fusion-sample images and real-style-fusion drawings to train a style-fusion-neural network with an adversarial loss that facilitates the style-fusion-neural network in generating fusion maps for style-fusion images that realistically portray stroke styles.

Turning now to FIG. 1, this figure illustrates a style-transfer system 100 that uses a multi-branch-style-transfer network 102 to generate a style-fusion image 112 that corresponds to a source image 104 and exhibits both edge-stroke and shading-stroke styles. In general, and as depicted in FIG. 1, the multi-branch-style-transfer network 102 has a first branch including a first NPR generator 106a that generates a simplified image 108a from a source image 104 and uses the edge-style-transfer-neural network 110 to generate a stylized-edge image 114 from the simplified image 108a. Additionally, the multi-branch-style-transfer network 102 has a second branch including a second NPR generator 106b that generates a simplified image 108b from the source image 104 and uses the shading-style-transfer-neural network 112 to generate a stylized-shading image 116 from the simplified image 108b. Additionally, the multi-branch-style-transfer network 102 includes a style-fusion-neural network

118 that fuses or combines the stylized-edge image 114 and the stylized-shading image 116 into a style-fusion image 122 using a fusion map 120.

As just noted, the style-transfer system 100 uses a single source image 104 as input to both branches of the multi-branch-style transfer network 102. As used in this disclosure, the term "source image" refers to an image captured by a camera, generated by a computing device, or created by hand for input. In some embodiments, a source image refers to an image input into a style-transfer-neural network as a basis or reference for generating a stylized-stroke image. Accordingly, a source image may be, but is not limited to, a drawing, natural photograph, painting, scan input into a style-transfer-neural network to generate a corresponding stylized-stroke image.

The term "NPR generator" refers to a non-photorealistic-rendering technique or system that generates an image portraying features of a source image. In particular, in some embodiments, an NPR generator is an operator, filter, equation, or function that converts a source image into a simplified image portraying features of the source image, such as edge depictions or shading. For example, in some embodiments, the style-transfer system 100 uses an extended difference-of-gaussians operator as the first NPR generator 106a. By contrast, in some embodiments, the style-transfer system 100 uses an objective-abstraction function as the second NPR generator 106b.

As further shown in FIG. 1, the style-transfer system 100 uses the first NPR generator 106a to generate a first simplified image 108a of the source image 104 and the second NPR generator 106b to generate a second simplified image 108b of the source image 104. The term "simplified image" refers to an image depicting one or more features of a source image. In particular, in certain implementations, a simplified image refers to an image depicting edges of a source image or a contrast abstraction of a source image. In some cases, a simplified image depicts edges or a contrast abstraction of a source image without representing other features of the source image. As shown in FIG. 1, for example, the first NPR generator 106a generates a simplified image 108a comprising stylized edge depictions from the source image 104. By contrast, the second NPR generator 106b generates a simplified image 108b comprising a contrast abstraction from the source image 104.

The term "style-transfer-neural network" refers to an artificial neural network that generates images portraying an input image in a particular artistic style. In particular, in certain implementations, a style-transfer-neural network refers to an artificial neural network that generates a stylized-stroke image that corresponds to a source image and that exhibits a stroke style. In some embodiments, a style-transfer-neural network comprises an encoder and a decoder, such as an encoder-decoder-neural network (e.g., a U-Net) or a convolutional neural network ("CNN") or a recurrent neural network ("RNN") comprising an encoder and a decoder.

As indicated by FIG. 1, a style-transfer-neural network may be, but is not limited to, an edge-style-transfer-neural network or a shading-style-transfer-neural network. The term "edge-transfer-neural network" refers to an artificial neural network that generates stylized-edge images portraying edges of a source image in a particular edge-stroke style. By contrast, the term "shading-transfer-neural network" refers to an artificial neural network that generates stylized-shading images portraying shading of a source image in a particular shading-stroke style.

As shown in FIG. 1, the edge-style-transfer-neural network 110 and the shading-style-transfer-neural network 112 respectively generate different stylized-stroke images—a stylized-edge image 114 and a stylized-shading image 116. The stylized-edge image 114 corresponds to the source image 104 and comprises edges exhibiting an edge-stroke style. The stylized-shading image 116 corresponds to the source image 104 and comprises shading exhibiting a shading-stroke style.

As used in this disclosure, the term "stylized-stroke image" refers to an image depicting features of a source image in an artistic style. In particular, a stylized-stroke image refers to an image depicting features of a source image using edges exhibiting an edge-stroke style or using shading exhibiting a shading-stroke style. The term "stylized-edge image" refers to a stylized image portraying edges of a source image in a particular edge-stroke style. The term "stylized-shading image" refers to a stylized image portraying shading of a source image in a particular shading-stroke style. More particularly, a stylized-stroke image can reflect unique characteristics of the stroke style both locally and holistically so that the stylized-stroke image appears authentic rather than computer generated.

Relatedly, the term "stroke style" refers to an artistic style for a stroke in an artistic medium. In particular, a stroke style may refer to an artistic style for a brush stroke, pencil stroke, or pen stroke in crayon, ink, painting, pastel, charcoal, pencil, pen, watercolor, woodcut, or other artistic medium. For instance, an "edge-stroke style" refers to an artistic portrayal of edges using strokes of a particular artistic medium. Similarly, a "shading-stroke style" refers to an artistic portrayal of shading using strokes of a particular artistic medium. In particular, a shading style may refer to line shading, crossed shading, smudge shading, stippling or other shading techniques in crayon, ink, painting, pastel, charcoal, pencil, pen, watercolor, woodcut, or other artistic medium.

As further shown in FIG. 1, the style-fusion-neural network 118 generates a fusion map 120 that the style-transfer system uses to fuse or combine the stylized-edge image 114 and the stylized-shading image 116. As used in this disclosure, the term "style-fusion-neural network" refers to an artificial neural network that generates a fusion map for synthesizing artistic styles from multiple images. In particular, in some embodiments, a style-fusion-neural network refers to an artificial neural network that generates a fusion map for synthesizing stroke styles from a stylized-edge image and a stylized-shading image. In some embodiments, the style-transfer system 100 uses a style-transfer-neural network comprising an encoder and a decoder, such as an encoder-decoder-neural network (e.g., a U-Net) or a CNN or an RNN comprising an encoder and a decoder.

Relatedly, the term "fusion map" refers to a map for blending components from multiple input images. In particular, a fusion map may refer to a weight map for alpha blending features of multiple stylized-stroke images (e.g., a stylized-edge image and a stylized-shading image). By weighting various values or pixels of multiple stylized-stroke images, a fusion map delineates the values or pixels represented from the stylized-stroke images in a style-fusion image.

As further shown in FIG. 1, the style-transfer system 100 applies the fusion map 120 to fuse the stylized-edge image 114 and the stylized-shading image 116 to generate the style-fusion image 122. As used in this disclosure, the term "style-fusion image" refers to an image including blended features of different artistic styles. In particular, in some cases, a style-fusion image refers to an output image that represents a blending of edges of a particular edge-stroke style from one image and shading of a particular shading-stroke style from another image. The style-fusion image 122, for instance, represents an output image that blends edge strokes of an edge-stroke style from the stylized-edge image 114 and shading of a shading-stroke style from the stylized-shading image 116.

While FIG. 1 depicts the style-transfer system 100 including a multi-branch-style-transfer network 102 to generate a style-fusion image 122, the style-transfer system 100 may comprise or use components of the multi-branch-style-transfer network 102 in isolation or in combination. For example, the style-transfer system 100 can apply (or train) in isolation either of the first or second branches of the multi-branch-style-transfer network 102. In particular, the style-transfer system 100 can apply (or train) in isolation either of an edge-style-transfer system including the first NPR generator 106a and the edge-style-transfer-neural network 110 or a shading-style-transfer system including the second NPR generator 106b and the shading-style-transfer-neural network 112.

Figure 2A:
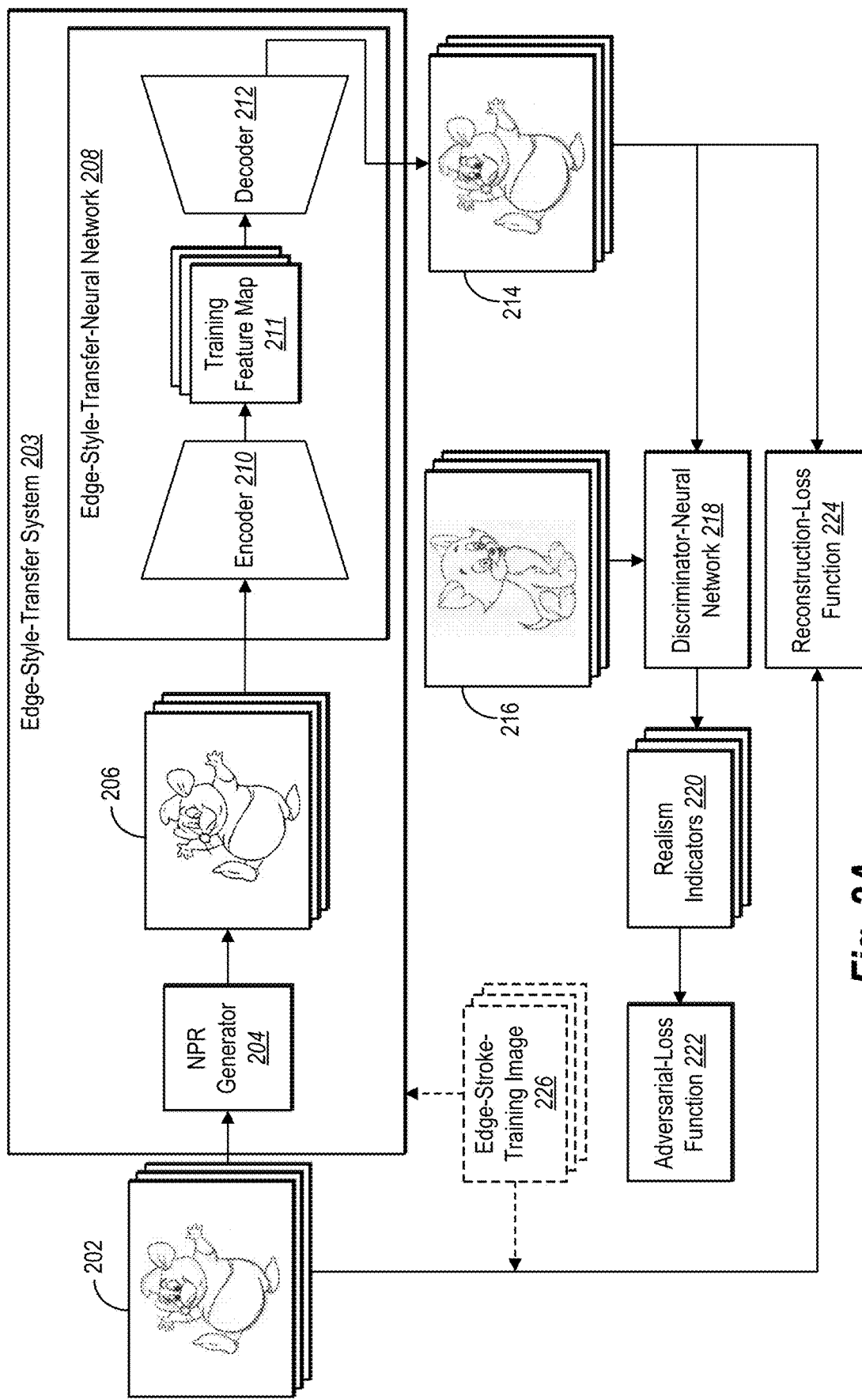
FIG. 2A illustrates training of an edge-style-transfer system, comprising an NPR generator and an edge-style-transfer-neural network, to generate stylized-edge-sample images exhibiting an edge-stroke style in accordance with one or more embodiments.

As indicated above, the style-transfer system 100 may use a single branch of the multi-branch-style-transfer network 102. For example, FIG. 2A illustrates an edge-style-transfer system 203 comprising an NPR generator 204 and an edge-style-transfer-neural network 208 that generates stylized-edge-images exhibiting an edge-stroke style. An overview of training the edge-style-transfer system 203 will now be provided. As shown in FIG. 2A, the style-transfer system 100 iteratively provides stroke-training images 202 to the NPR generator 204 to generate simplified-training images 206 during training. During each training iteration, the style-transfer system 100 provides a simplified-training image 206 to the edge-style-transfer-neural network 208 to generate a stylized-stroke-sample image 214. The style-transfer system 100 subsequently determines one or both of an adversarial loss and a reconstruction loss based on a comparison of the stylized-stroke-sample image 214 and one or more comparison-training images 216. The style-transfer system 100 then adjusts network parameters of the edge-style-transfer-neural network 208 based on the determined loss.

As shown in FIG. 2A, during training, the edge-style-transfer system 203 uses edge-stroke-training images 202 as a training input. The edge-stroke-training image 202 is an example of a stroke-training image. The term "stroke-training image" refers to an image that exhibits a stroke style and is used to train a neural network. In particular, in some embodiments, a stroke-training image refers to an image that a style-transfer system inputs into an NPR generator and that exhibits a stroke style that the system trains the style-transfer-neural network to portray in stylized-stroke images.

As noted above, the edge-stroke-training image 202 shown in FIG. 2A is an example of a stroke-training image. The term "edge-stroke-training image" refers to an image that exhibits an edge-stroke style and is used to train an edge-style-transfer-neural network to generate images portraying the edge-stroke style. An edge-stroke-training image may exhibit an edge-stroke style in a variety of different artistic mediums (e.g., crayon, charcoal, ink, pencil, woodcut).

After receiving the edge-stroke-training image 202 as an input, the NPR generator 204 generates a simplified-training image 206 of the edge-stroke-training image 202. The term "simplified-training image" refers to a simplified image of a stroke-training image used to train a stroke-style-transfer-neural network. As shown in FIG. 2A, for instance, the style-transfer system 100 uses the simplified-training image 206 as an input to train the edge-style-transfer-neural network 208. By using the NPR generator 204 as part of the training process, the style-transfer system 100 can generate the simplified-training image 206 depicting edges from the edge-stroke-training image 202. Accordingly, the NPR generator 204 and the simplified-training image 206 enable the style-transfer system 100 to avoid the need of paired ground-truth drawings that have been hand drawn.

To generate such a simplified-training image, in some embodiments, the edge-style-transfer system 203 includes a difference-of-gaussians operator as the NPR generator 204. In some such embodiments, the edge-style-transfer system 203 includes uses an extended difference-of-gaussians ("XDoG") operator as the NPR generator 204 to detect edges from a simplified-training image and generate a simplified-training image depicting the detected edges. For instance, the edge-style-transfer system 203 optionally includes the XDoG operator described by Holger Winnemoller et al., "XDoG: An eXtended difference-of-Gaussians compendium including advanced image stylization," *Computers & Graphics*, Vol. 36, Issue No. 6, pp. 720-753 (2012) (hereinafter "Winnemoller"), the entire contents of which are hereby incorporated by reference. In one or more embodiment, the ability of an XDoG to act as an edge stylization method that tolerates stroke thickness can provide the edge-style-transfer system 203 with increased robustness. The increased robustness can allow a trained edge-style-transfer system 203 to accept natural photographs and images an input and output realistic stroke-based images. In other words, the use of the XDoG as an NPR generator 204 can make the trained edge-style-transfer system 203 agnostic to input types (photographs, sketches, etc.).

When using an XDoG operator as the NPR generator 204, in some embodiments, the style-transfer system 100 uses the following equations to implement the XDoG:

$$D_{\sigma,k,\tau}(x) = G_\sigma(x) - \tau \cdot G_{k\sigma}(x) \quad (1)$$

$$T_{\epsilon,\varphi}(u) = \begin{cases} 1, & \text{if } u \geq \epsilon \\ 1 + \tanh(\varphi \cdot (u - \epsilon)), & \text{otherwise.} \end{cases} \quad (2)$$

In equations (1) and (2), parameter x represents a two-dimensional coordinate, parameter σ represents the standard deviation of a Gaussian distribution in a spatial domain, parameter k relates the radii of the standard deviations of the Gaussian equation G, parameter ϵ shifts the detection threshold to control sensitivity, parameter τ changes the relative weighting between the larger and smaller Gaussians to affect the tone-mapping response of the operator. The tan h function in equation (2) creates an adjustable soft ramp between edge values and non-edge values, with parameter φ controlling the steepness of this transition. By implementing equations (1) and (2) together, the style-transfer system 100 uses an XDoG filter of $T_{\epsilon,\varphi}(D_{\sigma,k,\tau}*I))$ for a given image I, such as an XDoG filter for an edge-stroke-training image to generate a simplified-training image.

As further shown in FIG. 2A, the trained edge-style-transfer system 203 uses the simplified-training image 206 as an input for the edge-style-transfer-neural network 208. The edge-style-transfer-neural network 208 includes an encoder 210 and a decoder 212. In the embodiment depicted in FIG. 2A, the encoder 210 extracts feature maps from simplified images. By contrast, the decoder 212 decodes feature maps to generate stylized-edge images exhibiting an edge-stroke style. As indicated above, in some embodiments, the edge-style-transfer-neural network 208 may be an encoder-decoder network, such as a U-Net, or may be a CNN or RNN. In some such embodiments, the style-transfer system 100 uses a U-Net comprising an encoder and decoder as described by Phillip Isola et al., "Image-to-Image Translation with Conditional Adversarial Networks," *Proceedings of the IEEE Conference on Computer Vision and Pattern Recognition* (2017) (hereinafter "Isola"), the entire contents of which are hereby incorporate by reference.

Upon receiving the simplified-training image 206, the encoder 210 extracts a training-feature map 211 from the simplified-training image 206. As used in this disclosure, the term "feature map" refers to a multi-dimensional array or multi-dimensional vector representing features of an image (e.g., a simplified image, a stylized-edge image, a stylized-shading image). For instance, a feature map for a simplified image may represent different visual or latent features of the simplified image.

As further shown in FIG. 2A, the decoder 212 of the edge-style-transfer-neural network 208 decodes the training-feature map 211 to generate a stylized-edge-sample image 214. By decoding the training-feature map 211 to generate the stylized-edge-sample image 214, the decoder 212 generates a stylized-stroke image depicting edges of the simplified-training image 206 in a particular edge-stroke style. As its name suggests, the term "stylized-edge-sample image" refers to a stylized-edge image generated during the training of an edge-style-transfer-neural network or training of another neural network. It is a sample as it is used for determining a loss with which to train the neural network, rather than be used as a final output.

After generating the stylized-edge-sample image 214, the style-transfer system 100 uses the stylized-edge-sample image 214 in determining a loss with which to update the parameters of the edge-style-transfer-neural network 203. More particularly, the style-transfer system 100 can determine one or both of an adversarial loss or a reconstruction loss. To determine an adversarial loss, in some embodiments, the style-transfer system 100 provides the stylized-edge-sample image 214 and a real-edge-stroke drawing 216 to a discriminator-neural network 218. The discriminator-neural network 218 generates realism indicators 220 for the stylized-edge-sample image 214 and the real-edge-stroke drawing 216. In some embodiments, the realism indicators 220 indicate whether the discriminator-neural network 218 identifies the stylized-edge-sample image 214 or the real-edge-stroke drawing 216 as real—that is, by identifying either the stylized-edge-sample image 214 or the real-edge-stroke drawing 216 as appearing to include more realistic strokes.

As used in this disclosure, the term "real-stroke drawing" refers to a drawing that includes features drawn with authentic strokes in a particular stroke style. For example, a "real-edge stroke drawing" refers to a drawing comprising edges drawn with authentic strokes in a particular edge-stroke style. By contrast, a "real-shading-stroke drawing" refers to a drawing comprising shading drawn with authentic strokes in a particular shading-stroke style. To facilitate determining an adversarial loss, a real-stroke drawing includes features drawn with strokes in the same stroke style as a stroke-training image. As shown in FIG. 2A, for instance, the real-edge-stroke drawing 216 includes edges drawn with strokes in the same edge-stroke style as the edge-stroke-training image 202. The real-stroke drawing can comprise the input stoke-training image or can comprise a different drawing as shown in FIG. 2A.

The term "discriminator-neural network" refers to an artificial neural network that determines whether images or drawings are real or fake (e.g., actual or imitation). In some embodiments, a discriminator-neural network is an artificial neural network that determines which of a real drawing or a stylized image comprises realistic strokes. To indicate which of a real drawing or a stylized image comprises realistic strokes, the discriminator-neural network can generate realism indicators. In some embodiments, a discriminator-neural network is a CNN, such as the convolutional "Patch-GAN0" classifier described in Isola. The discriminator-neural network 218 is an example of one such discriminator-neural network. The discriminator-neural network 218 and the edge-style-transfer system 203 together form a generative adversarial network ("GAN").

As shown in FIG. 2A, the discriminator-neural network 218 generates the realism indicators 220 indicating whether the stylized-edge-sample image 214 or the real-edge-stroke drawing 216 are real. The real-edge-stroke drawing 216 is an example of a real-stroke drawing. The term "realism indicator" refers to an indicator of whether one or more images is real or fake. In some embodiments, for instance, a realism indicator indicates whether a stylized-stroke-sample image is real or fake (e.g., by a classifier or a probability score). Additionally, or alternatively, realism indicators classify each of a stylized-stroke-sample image and a real-stroke drawing as real or fake, where the realism indicators include a different classification for the stylized-stroke-sample image and the real-stroke drawing. In some such embodiments, the realism indicators 220 identify the stylized-edge-sample image 214 as real or fake using a first expected error and identifies the real-edge-stroke drawing 216 as real or fake using a second expected error.

After the discriminator-neural network 218 generates the realism indicators 220, in some embodiments, the style-transfer system 100 determines an adversarial loss from an adversarial-loss function 222. In some such embodiments, for example, the style-transfer system 100 uses the following equation as the adversarial-loss function 222:

$$\mathcal{L}_{cGAN}(G,D) = \mathbb{E}[\log D(r)] + \mathbb{E}_{x,z}[\log(1-D(G(x,z)))] \quad (3)$$

Equation (3) includes a loss L of a conditional GAN, that is, cGAN. In equation (3), the generator G represents a generator-neural network, and the discriminator D represents a discriminator-neural network. Parameter r represents a real drawing, parameter x represents an observed input image, and parameter z represents a random Gaussian noise vector, which can be used to increase the robustness of the network. During training iterations based on equation (3), the back propagation attempts to minimize a loss $\mathcal{L}_{cGAN}$, while also maximizing the loss $\mathcal{L}_{cGAN}$, such that $G^* = \arg_G^{min} {}_D^{max} \mathcal{L}_{cGAN}(G,D)$. In other words, during training the style-transfer system 100 seeks to modify the parameters of the neural network so as to produce a stylized image most similar to the input that also tricks the discriminator into thinking it is a real stroke drawing.

When applying equation (3) to determine an adversarial loss for the edge-style-transfer-neural network 208, the edge-style-transfer system 203 represents the generator G, and the discriminator-neural network 218 represents the discriminator D. During the training iteration described above, the style-transfer system 100 inputs the edge-stroke-training image 202 (as the observed input image x) into the NPR generator 204 of the edge-style-transfer system 203.

Based on the simplified-training image 206 generated by the NPR generator 204, the edge-style-transfer-neural network 208 subsequently generates the stylized-edge-sample image 214 (as the output of the generator G). The style-transfer system 100 further inputs the stylized-edge-sample image 214 (i.e., the output of G (x, z)) and the real-edge-stroke drawing 216 (i.e., real drawing r) into the discriminator-neural network 218.

Continuing the application of equation (3), upon receiving the stylized-edge-sample image 214 and the real-edge-stroke drawing 216, the discriminator-neural network 218 generates the realism indicators 220 to classify the stylized-edge-sample image 214 (i.e., the output of the generator G) and the real-edge-stroke drawing 216 (i.e., the real drawing r) as either real or fake. By implementing equation (3), the style-transfer system 100 trains (i) the edge-style-transfer-neural network 208 to generate stylized-edge-sample images that the discriminator-neural network 218 cannot distinguish from real-edge-stroke drawings. In alternative embodiments, the style-transfer system 100 can utilize other loss functions for the adversarial-loss function 222.

In addition (or in the alternative) to determining an adversarial loss, in some embodiments, the style-transfer system 100 determines a reconstruction loss when training the edge-style-transfer-neural network 208. As shown in FIG. 2A, for example, the style-transfer system 100 determines a reconstruction loss from a reconstruction-loss function 224 based on a comparison of the edge-stroke-training image 202 and the stylized-edge-sample image 214. In determining a reconstruction loss from the reconstruction-loss function 224, in some embodiments, the style-transfer system 108 determines an L1 distance between the edge-stroke-training image 202 and the stylized-edge-sample image 214.

For example, in certain implementations, the style-transfer system 100 uses the following equation as the reconstruction-loss function 224:

$$\mathcal{L}_{L1}(G) = \mathbb{E}_{x,y,z}[\|y-G(x,z)\|_1] \quad (4)$$

As indicated by equation (4), to determine the loss $\mathcal{L}_{L1}$ for the generator G, the style-transfer system 100 determines a distance between the stylized-edge-sample image 214 (as the output image y) and the output of the edge-style-transfer-neural network 208, where the edge-stroke-training image 202 (as the observed input image x) is input into the NPR generator 204 of the edge-style-transfer system 203 and the random Gaussian noise vector z is input into the edge-style-transfer-neural network 208 of the edge-style-transfer system 203 to form the inputs for the generator G (i.e., G(x, z)). In the alternative to equation (4), the style-transfer system 100 can utilize a variety of other loss functions for the reconstruction-loss function 224, including, for example, L2 loss.

Upon determining one or both of an adversarial loss and a reconstruction loss, the style-transfer system 100 adjusts network parameters (e.g., weights or values) of one or both of the edge-style-transfer-neural network 208 and the discriminator-neural network 218 via back propagation. For example, the style-transfer system 100 may modify weights or values of the edge-style-transfer-neural network 208 using gradient ascent or descent techniques to reduce the loss in a subsequent training iteration.

In some embodiments, the style-transfer system 100 combines both an adversarial loss and a reconstruction loss into an objective function that guides adjusting network parameters during training. For instance, in certain implementations, the style-transfer system 100 uses the following objective function:

$$G^* = \arg_G^{min}{}_D^{max} \mathcal{L}_{cGAN}(G,D) + \lambda \mathcal{L}_{L1}(G) \quad (5)$$

According to training iterations following the objective in equation (5), the style-transfer system 100 adjusts network parameters of the generator G and the discriminator D to minimize the overall objective function loss. In other words, the objective function trains the edge-style-transfer system 203 both to generate stylized drawings that both look like the simplified image 206 but that also appear like real drawings.

The style-transfer system 100 can iteratively train the edge-style-transfer system 203. In one or more embodiments, the style-transfer system 100 implements batch training where the style-transfer system 100 averages the loss of a batch of training iterations and back propagates based on the average batch loss. In certain implementations, the style-transfer system 100 continues to perform training iterations until satisfying a convergence criteria. For instance, in some cases, the style-transfer system 100 performs training iterations until the value or weights of the edge-style-transfer-neural network 208 do not change significantly across training iterations or the edge-style-transfer-neural network 208 converges.

As suggested above, in some embodiments, the style-transfer system 100 trains the edge-style-transfer-neural network 208 to generate stylized-edge images exhibiting different edge-stroke styles. For instance, the style-transfer system 100 can train the edge-style-transfer-neural network 208 to generate stylized-edge images comprising edges exhibiting an edge-stroke style in crayon, ink, pastel, charcoal, pencil, woodcut, or other artistic medium. In some such embodiments, the style-transfer system 100 trains the edge-style-transfer-neural network 208 to generate stylized-edge images exhibiting different edge-stroke styles in a particular artistic medium, such as a first edge-stroke style in pencil strokes and a second edge-stroke style in pencil strokes. Such differing edge-stroke styles may include, for instance, different stroke breadths.

To train the edge-style-transfer-neural network 208 to generate such stylized-edge images of differing styles, in certain implementations, the style-transfer system 100 randomly selects edge-stroke-training images exhibiting different edge-stroke styles to input for a given training iteration. As shown in FIG. 2A, for instance, the style-transfer system 100 randomly selects an edge-stroke-training image for a given training iteration from (i) the edge-stroke-training images 202 exhibiting a first edge-stroke style or (ii) edge-stroke-training-images 226 exhibiting a second edge-stroke style.

Alternatively, in certain implementations, the style-transfer system 100 inputs edge-stroke-training images exhibiting different edge-stroke styles according to a particular order for each training iteration. In an alternative implementation of FIG. 2A, for instance, the style-transfer system 100 alternates inputs of an edge-stroke-training image for a given training iteration from (i) the edge-stroke-training images 202 exhibiting a first edge-stroke style and (ii) the edge-stroke-training-images 226 exhibiting a second edge-stroke style. By inputting edge-stroke-training images exhibiting different edge-stroke styles according to a random selection or a particular order, the style-transfer system 100 can train the edge-style-transfer-neural network 208 to generate stylized-edge images exhibiting different edge-stroke styles.

Figure 2B:
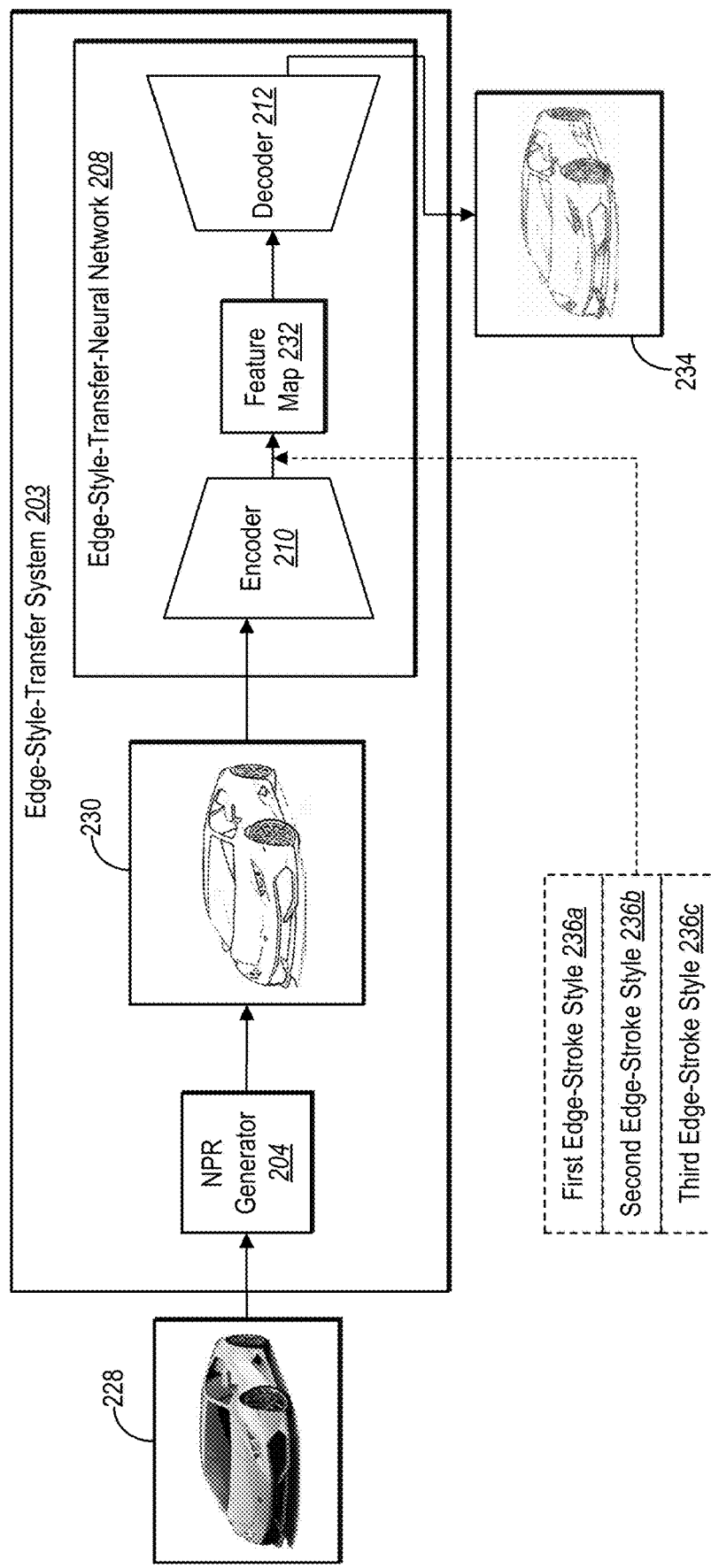
FIG. 2B illustrates a trained edge-style-transfer system utilizing an NPR generator and an edge-style-transfer-neural network to generate a stylized-edge image exhibiting an edge-stroke style in accordance with one or more embodiments.

Once trained, the edge-style-transfer system 203 can generate stylized-edge images from a natural image or other input image. FIG. 2B illustrates one such application of the edge-style-transfer system 203. In general, FIG. 2B illustrates the NPR generator 204 generating a simplified image 230 from a source image 228. While FIG. 2B uses a natural photograph as the source image 228 for illustrative purposes, the source image 228 may be a drawing, scan, painting, or other image. The edge-style-transfer-neural network 208 then extracts a feature map 232 from the simplified image 230 using the encoder 210 and decodes the feature map 232 using the decoder 212 to generate a stylized-edge image 234 that both corresponds to the source image 228 and exhibits an edge-stroke style.

As noted above, in some embodiments, the edge-style-transfer system 203 can optionally generate a stylized-edge image exhibiting one of a variety of edge-stroke styles selected by a user. As indicated relative to FIG. 2A, for instance, the style-transfer system 100 can train the edge-style-transfer system 203 to generate stylized-edge images exhibiting different edge-stroke styles. FIG. 2B depicts different edge-stroke styles that the edge-style-transfer system 203 can implement as a result of such training.

In particular, FIG. 2B illustrates a first edge-stroke style 236a, a second edge-stroke style 236b, and a third edge-stroke style 236c from which a user of the edge-style-transfer system 203 may select. In some embodiments, the style-transfer system 100 provides a client device an edge-style setting corresponding to each of the first edge-stroke style 236a, the second edge-stroke style 236b, and the third edge-stroke style 236c for display within a user interface.

In certain implementations, the style-transfer system 100 receives an indication of a user selection from the client device of an edge-style setting corresponding to an edge-stroke style from among the edge-stroke styles 236a-236c. Based on receiving the indication of the user selection of the edge-style setting, the style-transfer system 100 generates the stylized-edge image 234 comprising edges exhibiting the corresponding edge-stroke style. For illustrative purposes, FIG. 2B depicts the stylized-edge image 234 exhibiting one such edge-stroke style. But the style-transfer system 100 can generate stylized-edge images in a variety of edge-stroke styles in various artistic mediums upon user selection.

Figure 3A:
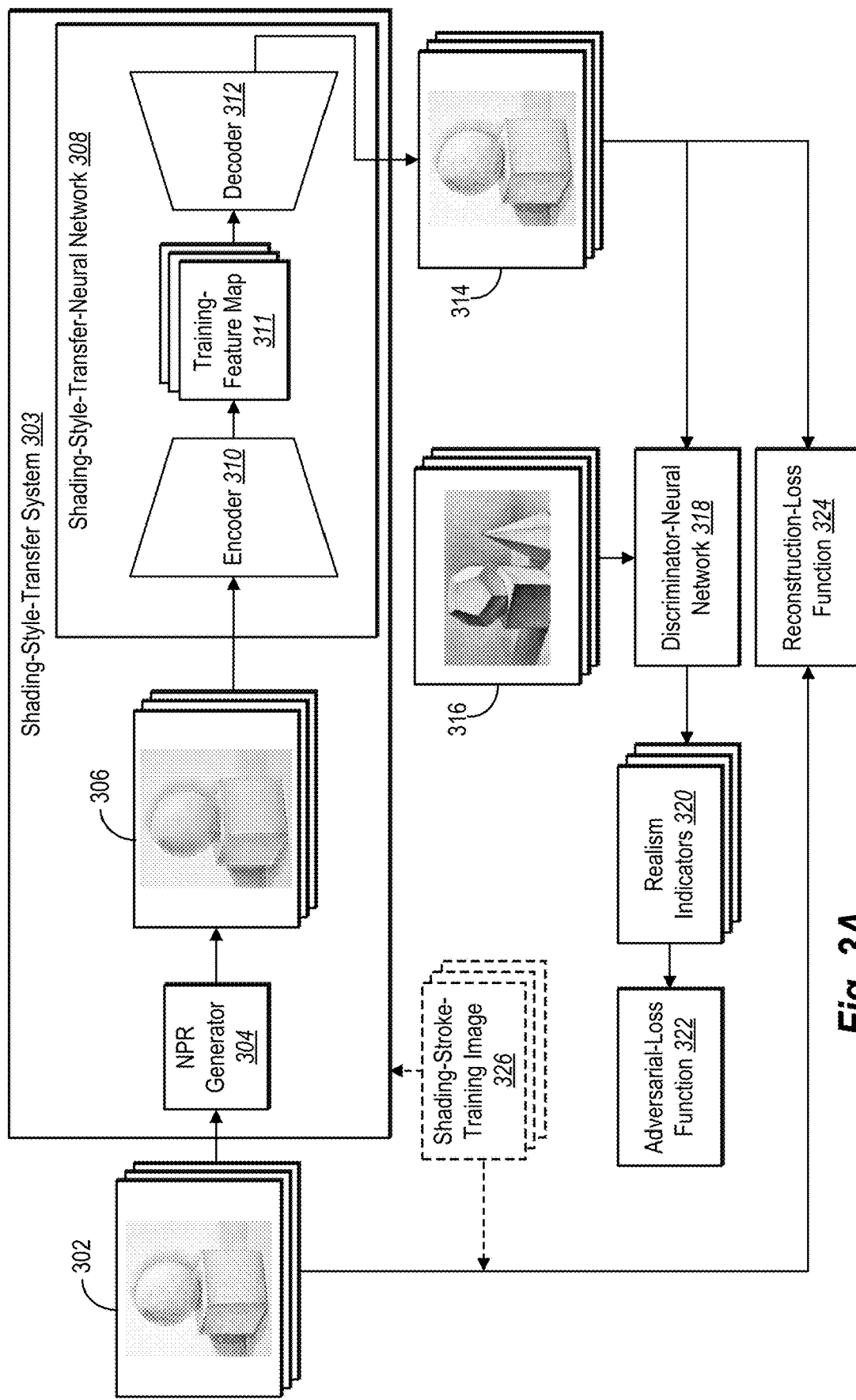
FIG. 3A illustrates training of an edge-style-transfer system, comprising an NPR generator and a shading-style-transfer-neural network, to generate stylized-shading-sample images exhibiting a shading-stroke style in accordance with one or more embodiments.

As indicated above, the style-transfer system 100 may use a single branch of the multi-branch-style-transfer network 102. For example, FIG. 3A illustrates a shading-style-transfer system 303 comprising an NPR generator 304 and a shading-style-transfer-neural network 308 that generates stylized-shading-sample images 314 exhibiting a shading-stroke style. An overview of training the shading-style-transfer system 303 will now be provided. As shown in FIG. 3A, the style-transfer system 100 uses the iteratively provides the NPR generator 304 to generate simplified-training images 306 from shading-stroke-training images 302. During each training iteration, the style-transfer system 100 provides a simplified-training image to the shading-style-transfer-neural network 308 to generate a stylized-shading-sample image. The style-transfer system 100 subsequently determines one or both of an adversarial loss and a reconstruction loss based on a comparison of the stylized-shading-sample image and one or more comparison-training images to adjust network parameters of the shading-style-transfer-neural network 308.

As shown in FIG. 3A, the shading-style-transfer system 303 takes a shading-stroke-training image 302 as input. Similar to the edge-stroke-training images described above, the shading-stroke-training image 302 is an example of a stroke-training image. Accordingly, the term "shading-stroke-training image" refers to an image that exhibits a shading-stroke style and is used to train a shading-style-transfer-neural network to generate images portraying the shading-stroke style. Consistent with the disclosure above, a shading-stroke-training image may exhibit a shading-stroke style in a variety of different artistic mediums (e.g., crayon, ink, pencil, woodcut).

After receiving the shading-stroke-training image 302 as an input, the NPR generator 304 generates the simplified-training image 306 of the shading-stroke-training image 302. As shown in FIG. 3A, the style-transfer system 100 uses the simplified-training image 306 as an input to train the shading-style-transfer-neural network 308. By using the NPR generator 304 as part of the training process, the style-transfer system 100 can generate the simplified-training image 306 depicting a contrast abstraction from the shading-stroke-training image 302. Accordingly, the NPR generator 304 and the simplified-training image 306 enable the style-transfer system 100 to avoid conventional training images requiring paired ground-truth drawings that have been hand drawn.

To generate such a simplified-training image, in some embodiments, the style-transfer system 100 uses an objective-abstraction function as the NPR generator 304. For example, the style-transfer system 100 can use an objective-abstraction function corresponding to the shading-style-transfer-neural network 308 to generate the simplified-training image 306 comprising a contrast abstraction from the shading-stroke-training image 302. For instance, the style-transfer system 100 optionally uses an abstract function described by Cewu Lu et al., "Combining Sketch and Tone for Pencil Drawing Production," *International Symposium on Non-Photorealistic Animation and Rendering* (2012) (hereinafter "Lu"), the entire contents of which are hereby incorporated by reference.

When using an objective-abstraction function as the NPR generator 304, in some embodiments, the style-transfer system 100 uses the following equation:

$$\beta^* = \arg_\beta{}^{min} \|\beta \ln H - \ln J\|_2^2 + \lambda \|\nabla \beta\|_2^2 \quad (6)$$

In equation (6), parameter β represents an optimizing parameter, parameter J represents a source image, parameter H represents an edge map of the source image, and parameter λ represents a weight (e.g., 0.2). Upon determining an optimal the style-transfer system 100 determines $H^\beta$ as the abstraction result—that is, as a simplified image of a source image comprising contrast abstractions from the source image. When using the NPR generator 304 during training, in certain implementations, the style-transfer system 100 inputs the shading-stroke-training image 302 as the source image J, generates an edge map H for the shading-stroke-training image 302, and determines an optimal β from equation (6) to generate $H^\beta$ as the simplified-training image 306.

As further shown in FIG. 3A, the style-transfer system 100 provides the simplified-training image 306 to the shading-style-transfer-neural network 308. The shading-style-transfer-neural network 308 includes an encoder 310 and a decoder 312. In the embodiment depicted in FIG. 3A, the encoder 310 extracts feature maps from simplified images. By contrast, the decoder 312 decodes feature maps to generate stylized-shading images exhibiting a shading-stroke style. As indicated above, in some embodiments, the shading-style-transfer-neural network 308 may be an encoder-decoder network, such as a U-Net, or may be a CNN or RNN.

Upon receiving the simplified-training image 306, the encoder 310 extracts a training-feature map 311 from the simplified-training image 306. In some embodiments, the training-feature map 311 includes visual or latent features representing different aspects of the simplified-training image 306. The style-transfer system 100 further provides the training-feature map 311 to the decoder 312 of the shading-style-transfer-neural network 308. The decoder 312 subsequently decodes the training-feature map 311 to generate the stylized-shading-sample image 314.

By decoding the training-feature map 311 to generate the stylized-shading-sample image 314, the decoder 312 generates a stylized-stroke image depicting shading that corresponds to a contrast abstraction of the simplified-training image 306 in a particular shading-stroke style. As its name suggests, the term "stylized-shading-sample image" refers to a stylized-shading image generated during the training of a shading-style-transfer-neural network or training of another neural network.

After generating the stylized-shading-sample image 314, the style-transfer system 100 can use the stylized-shading-sample image 314 in determining one or both of an adversarial loss or a reconstruction loss. To determine an adversarial loss, in some embodiments, the style-transfer system 100 provides the stylized-shading-sample image 314 and a real-shading-stroke drawing 316 to a discriminator-neural network 318. As shown in FIG. 3A, the real-shading-stroke drawing 316 includes shading drawn with strokes in the same shading-stroke style as the shading-stroke-training image 302. Consistent with the disclosure above, the discriminator-neural network 318 may be a CNN, such as the convolutional "PatchGAN" classifier described in Isola. The discriminator-neural network 318 and the shading-style-transfer system 303 together form a GAN.

As further depicted in FIG. 3A, the discriminator-neural network 318 generates realism indicators 320 for the stylized-shading-sample image 314 and the real-shading-stroke drawing 316. In some embodiments, the realism indicators 320 indicate whether the discriminator-neural network 318 identifies the stylized-shading-sample image 314 or the real-shading-stroke drawing 316 as real—that is, by identifying either the stylized-shading-sample image 314 or the real-shading-stroke drawing 316 as appearing to include more realistic strokes. In some such embodiments, the realism indicators 320 identify the stylized-shading-sample image 314 as real or fake using a first expected error and identifies the real-shading-stroke drawing 316 as real or fake using a second expected error.

After the discriminator-neural network 318 generates the realism indicators 320, in some embodiments, the style-transfer system 100 determines an adversarial loss from an adversarial-loss function 322. For instance, in some embodiments, the style-transfer system 100 uses equation (3) to determine an adversarial loss for the shading-style-transfer-neural network 308. When applying equation (3) in this context, the shading-style-transfer system 303 represents the generator G, and the discriminator-neural network 318 represents the discriminator D. During the training iteration described above, the style-transfer system 100 inputs the shading-stroke-training image 302 (as the observed input image x) into the NPR generator 304 of the shading-style-transfer system 303. Based on the simplified-training image 306 from the NPR generator 304, the shading-style-transfer-neural network 308 subsequently generates the stylized-shading-sample image 314 (as the output of the generator G). The style-transfer system 100 further inputs the stylized-shading-sample image 314 (i.e., the output of G (x, z)) and the real-shading-stroke drawing 316 (i.e., real drawing r) into the discriminator-neural network 318.

Continuing the application of equation (3), upon receiving the stylized-shading-sample image 314 and the real-shading-stroke drawing 316, the discriminator-neural network 318 generates the realism indicators 320 to classify the stylized-shading-sample image 314 (i.e., the output of the generator G) and the real-shading-stroke drawing 316 (i.e., the real drawing r) as either real or fake. By implementing equation (3), the style-transfer system 100 trains (i) the shading-style-transfer-neural network 308 to generate stylized-shading-sample images that the discriminator-neural network 318 cannot distinguish from real-shading-stroke drawings and (ii) the discriminator-neural network 318 to detect the stylized-shading-sample images as fake. In the alternative to equation (3), the style-transfer system 100 can utilize a variety of other loss functions for the adversarial-loss function 322.

In addition (or in the alternative) to determining an adversarial loss, in some embodiments, the style-transfer system 100 determines a reconstruction loss when training the shading-style-transfer-neural network 308. As shown in FIG. 3A, for example, the style-transfer system 100 determines a reconstruction loss from a reconstruction-loss function 324 based on a comparison of the shading-stroke-training image 302 and the stylized-shading-sample image 314. By determining a reconstruction loss from the reconstruction-loss function 324, in some embodiments, the style-transfer system 108 determines an L1 distance between the shading-stroke-training image 302 and the stylized-shading-sample image 314.

In some embodiments, the style-transfer system 100 applies equation (4) to determine a reconstruction loss for the shading-style-transfer-neural network 308. As indicated by equation (4), to determine the loss $L_{L1}$ for the generator G, the style-transfer system 100 determines a distance between the stylized-shading-sample image 314 (as the output image y) and the output of the shading-style-transfer-neural network 308, where the shading-stroke-training image 302 (as the observed input image x) is input into the NPR generator 304 of the shading-style-transfer system 303 and the random Gaussian noise vector z is input into the shading-style-transfer-neural network 308 of the shading-style-transfer system 303 to form the inputs for the generator G (i.e., G (x, z)). In the alternative to equation (4), the style-transfer system 100 can utilize a variety of other loss functions for the reconstruction-loss function 324, including, for example, L2 loss.

Upon determining one or both of an adversarial loss and a reconstruction loss, the style-transfer system 100 adjusts network parameters (e.g., weights or values) of one or both of the shading-style-transfer-neural network 308 and the discriminator-neural network 318 as described above in relation to the training of the edge-style-transfer system 203. For example, the style-transfer system 100 may increase or decrease weights or values of the shading-style-transfer-neural network 308 to reduce the adversarial loss in a subsequent training iteration and/or reduce the reconstruction loss in the subsequent training iteration.

In some such embodiments, the style-transfer system 100 combines both an adversarial loss and a reconstruction loss into an objective that guides adjusting the network parameters of the shading-style-transfer-neural network 308 and the discriminator-neural network 318, such as by following the objective in equation (5). As applied to networks shown in FIG. 3A for an initial training iteration, for instance, the style-transfer system 100 (i) adjusts the network parameters of the shading-style-transfer-neural network 308 to both reduce the loss $\mathcal{L}_{cGAN}$ and reduce the loss $\mathcal{L}_{L1}$ in a subsequent training iteration and (ii) adjusts the network parameters of the discriminator-neural network 318 to increase the loss $\mathcal{L}_{cGAN}$ in the subsequent training iteration. In certain implementations, the style-transfer system 100 continues to perform such training iterations until satisfying a convergence criteria (e.g., according to the objective in equation (5)).

As suggested above, in some embodiments, the style-transfer system 100 trains the shading-style-transfer-neural network 308 to generate stylized-shading images exhibiting different shading-stroke styles. For instance, the style-transfer system 100 can train the shading-style-transfer-neural network 308 to generate stylized-shading images comprising shading exhibiting a shading-stroke style in crayon, ink, pastel, pencil, woodcut, or other artistic medium. In some such embodiments, the style-transfer system 100 trains the shading-style-transfer-neural network 308 to generate stylized-shading images exhibiting different shading-stroke styles in a particular artistic medium, such as a first shading-stroke style in pencil strokes and a second shading-stroke style in pencil strokes. Such differing shading-stroke styles may include, for instance, different shading techniques (e.g., crossed-stroke shading, line-stroke shading, smudge-stroke shading, stippling-stroke shading).

To train the shading-style-transfer-neural network 308 to generate such stylized-shading images of differing styles, in certain implementations, the style-transfer system 100 inputs shading-stroke-training images exhibiting different shading-stroke styles into the NPR generator 304 for a given training iteration according to a random selection or a particular order. As indicated by FIG. 3A, for instance, the style-transfer system 100 randomly selects (or alternates inputs of) a shading-stroke-training image for a given training iteration from (i) the shading-stroke-training images 302 exhibiting a first shading-stroke style or (ii) shading-stroke-training-images 326 exhibiting a second shading-stroke style. By inputting a shading-stroke-training images exhibiting different shading-stroke styles into the NPR generator 304 according to a random selection or a particular order, the style-transfer system 100 can train the shading-style-transfer-neural network 308 to generate stylized-shading images exhibiting different shading-stroke styles.

Figure 3B:
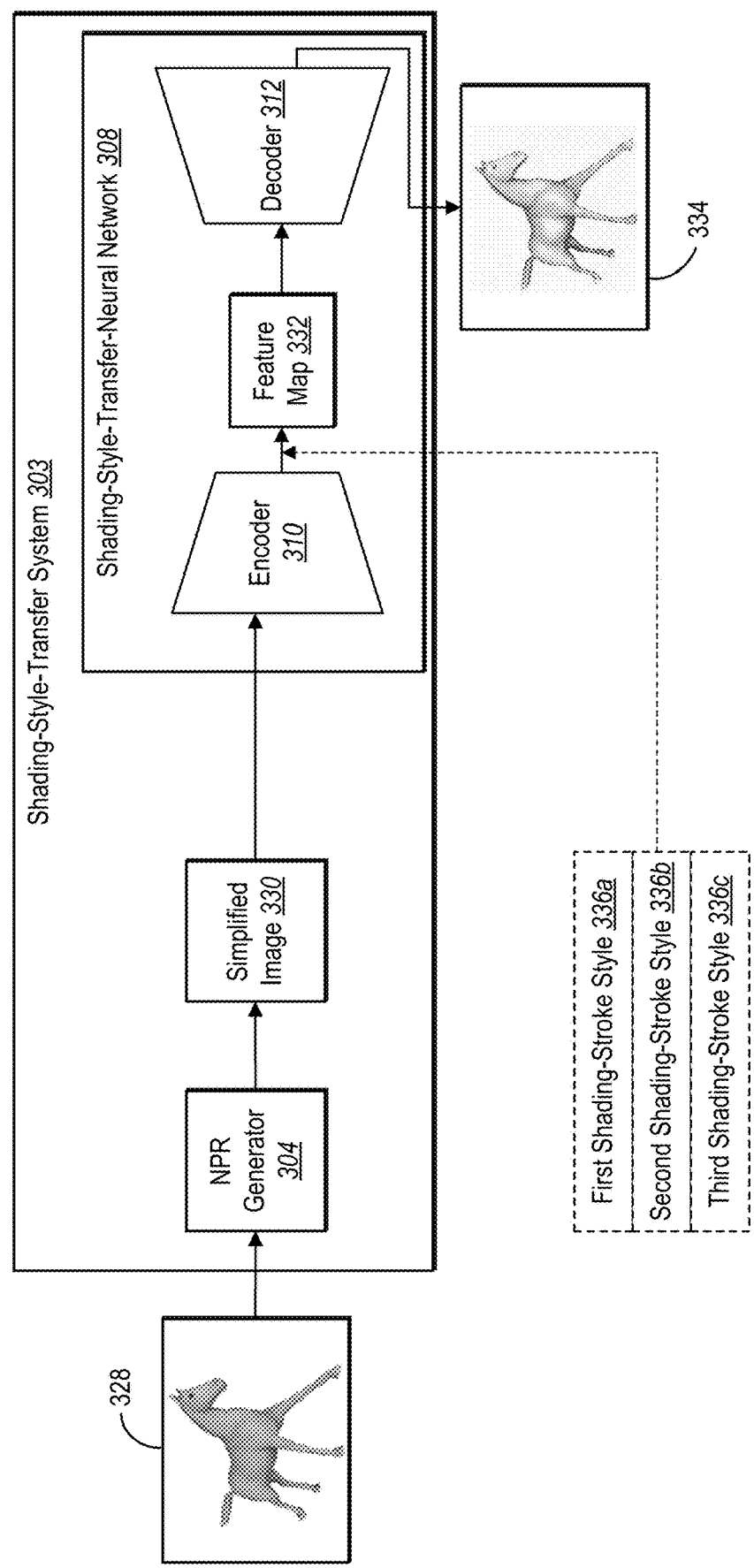
FIG. 3B illustrates a trained edge-style-transfer system utilizing an NPR generator and a shading-style-transferneural network to generate a stylized-shading image exhibiting a shading-stroke style in accordance with one or more embodiments.

Once trained, the shading-style-transfer system 303 can generate stylized-shading images from a natural image or other input image. FIG. 3B illustrates one such application of the shading-style-transfer system 203. In general, FIG. 3B illustrates the NPR generator 304 generating a simplified image 330 from the source image 328. As indicated within the shading-style-transfer-neural network 308, the style-transfer system 100 extracts a feature map 332 from the simplified image 330 using the encoder 310 and decodes the feature map 332 using the decoder 312 to generate a stylized-shading image 334.

As shown in FIG. 3B, the style-transfer system 100 provides the source image 328 to the NPR generator 304 corresponding to the shading-style-transfer-neural network 308. While FIG. 3B uses a computer-generated drawing as the source image 328 for illustrative purposes, the source image 328 may be a natural photograph, scan, painting, or other image input into the NPR generator 304. The NPR generator 304 subsequently modifies the source image 328 to generate the simplified image 330 of the source image 328.

As noted above, in some embodiments, the style-transfer system 100 can apply the shading-style-transfer-neural network 308 to generate a stylized-shading image exhibiting a variety of shading-stroke styles selected by a user. As indicated in FIG. 3A, for instance, the style-transfer system 100 can train the shading-style-transfer-neural network 308 to generate stylized-shading images exhibiting different shading-stroke styles. FIG. 3B depicts different shading-stroke styles that the style-transfer system 100 can implement as a result of such training.

In particular, FIG. 3B illustrates a first shading-stroke style 336a, a second shading-stroke style 336b, and a third shading-stroke style 336c from which a user of the style-transfer system 100 may select. In some embodiments, the style-transfer system 100 provides a client device a shading-style setting corresponding to each of the first shading-stroke style 336a, the second shading-stroke style 336b, and the third shading-stroke style 336c for display within a user interface.

In certain implementations, the style-transfer system 100 receives an indication of a user selection from the client device of a shading-style setting corresponding to a shading-stroke style from among the shading-stroke styles 336a-336c. Based on receiving the indication of the user selection of the shading-style setting, the style-transfer system 100 generates the stylized-shading image 334 comprising shading exhibiting the corresponding shading-stroke style. For illustrative purposes, FIG. 3B depicts the stylized-shading image 334 exhibiting one such shading-stroke style. But the style-transfer system 100 can generate stylized-shading images in a variety of shading-stroke styles in various artistic mediums upon user selection.

Figure 4A:
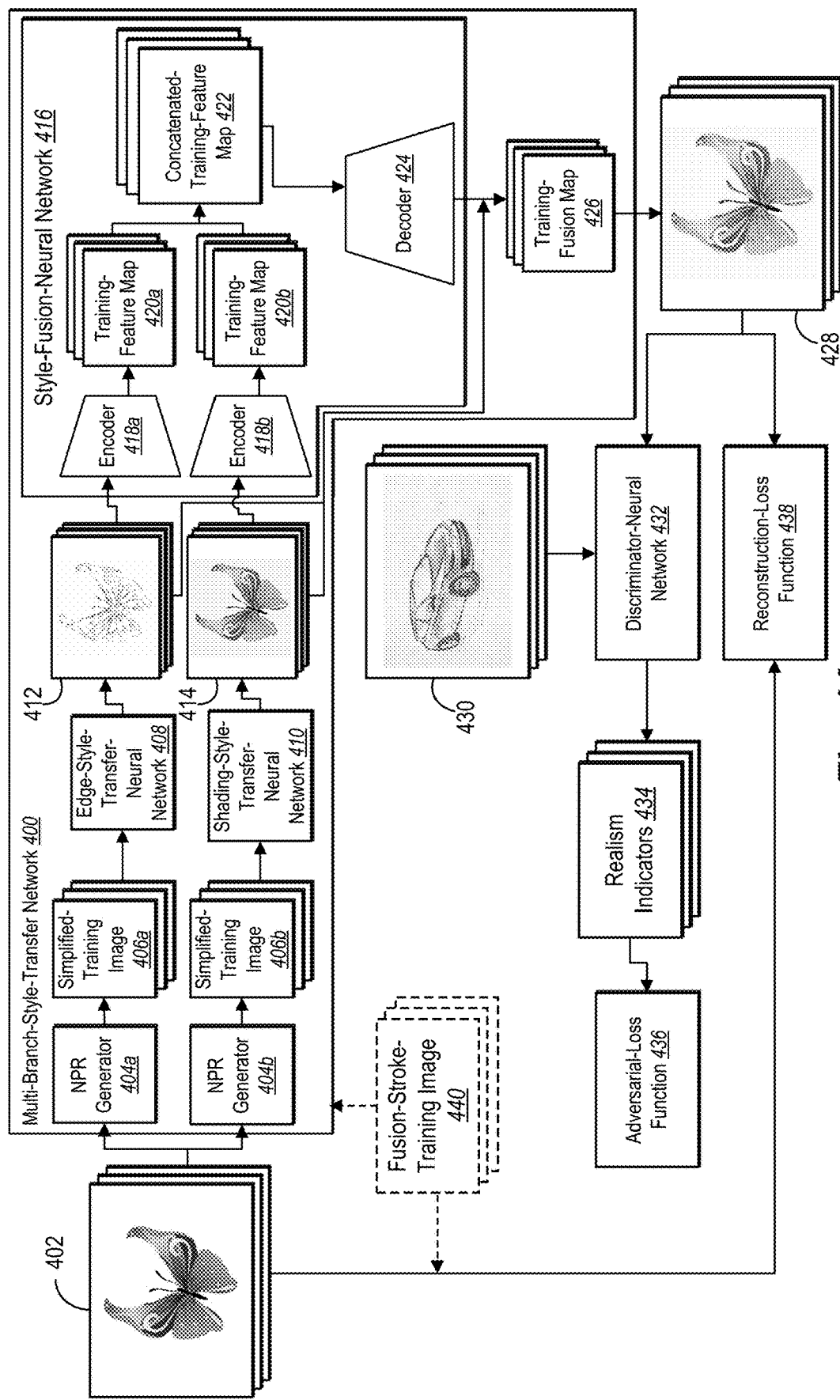
FIG. 4A illustrates a style-transfer system training a style-fusion-neural network to generate style-fusion-sample images exhibiting an edge-stroke style and a shading-stroke style in accordance with one or more embodiments.

As indicated above, the style-transfer system 100 may also train or apply a style-fusion-neural network within a multi-branch-style-transfer network. FIG. 4A illustrates the style-transfer system 100 training a style-fusion-neural network 416. As shown in FIG. 4A, the style-transfer system 100 uses a multi-branch-style-transfer network 400 to train the style-fusion-neural network 416. The multi-branch-style-transfer network 400 includes NPR generators and neural networks that function together during training iterations. In particular, the multi-branch-style-transfer network 400 includes the first NPR generator 404a corresponding to the edge-style-transfer-neural network 408 and the second NPR generator 404b corresponding to the shading-style-transfer-neural network 410—each of which function in a similar manner to corresponding generators and networks described above. The multi-branch-style-transfer network 400 further includes the style-fusion-neural network 416 that the other generators and networks shown in FIG. 4A work in combination to train.

As depicted by FIG. 4A, the style-transfer system 100 provides a fusion-stroke-training image 402 to both the first NPR generator 404a and to the second NPR generator 404b. As used in this disclosure, the term "fusion-stroke-training image" refers to an image that exhibits multiple stroke styles and is used to train a neural network. In particular, in some embodiments, a fusion-stroke-training image refers to an image that a style-transfer system inputs into a multi-branch-style-transfer network and that exhibits stroke styles that the system trains a style-fusion-neural network to capture or map in fusion maps corresponding to style-fusion images. For example, a fusion-stroke-training image can include both shading and edge strokes.

Having received the fusion-stroke-training image 402, the first NPR generator 404a and the second NPR generator 404b respectively generate a simplified-training image 406a of the fusion-stroke-training image 402 and a simplified-training image 406b of the fusion-stroke-training image 402.

Based on the simplified-training image, the edge-style-transfer-neural network 408 generates a stylized-edge-sample image 412. Similarly, based on the simplified-training image from the second NPR generator 404b, the shading-style-transfer-neural network 410 generates a stylized-shading-sample image 414.

As further shown in FIG. 4A, the style-transfer system 100 provides the stylized-edge-sample image and the stylized-shading-sample image to the style-fusion-neural network 416. The style-fusion-neural network 416 includes at least a first encoder 418a, a second encoder 418b, and a decoder 424. The first encoder 418a and the second encoder 418b extract feature maps from simplified images. By contrast, the decoder 424 decodes concatenated-feature maps to generate fusion maps. In some embodiments, the style-fusion-neural network 416 may be an encoder-decoder network, such as a U-Net, or may be a CNN or RNN.

After the style-fusion-neural network 416 receives the stylized-edge-sample image 412 and the stylized-shading-sample image 414, the first encoder 418a extracts a training-feature map 420a from the stylized-edge-sample image 412. Similarly, the second encoder 418b extracts a training-feature map 420b from the stylized-shading-sample image 414. As indicated by FIG. 4A, the training-feature map 420a and the training-feature map 420b include features representing edges and contrast abstraction from the stylized-edge-sample image 412 and the stylized-shading-sample image 414, respectively. Upon extracting such training-feature maps, the style-transfer system 100 concatenates the training-feature maps 420a and 420b to generate a concatenated-training-feature map 422.

As further shown in FIG. 4A, the style-transfer system 100 provides the concatenated-training-feature map 422 to the decoder 424 of the style-fusion-neural network 416. The decoder 424 decodes the concatenated-training-feature map 422 to generate the training-fusion map 426. As its name implies, the term "training-fusion map" refers to a fusion map generated or used during training of a neural network. In particular, a training-fusion map may refer to a weight map for alpha blending features of multiple stylized-stroke images (e.g., a stylized-edge-sample image and a stylized-shading-sample image).

As further indicated by FIG. 4A, the style-transfer system 100 uses the training-fusion map 426 to combine the stylized-edge-sample image 412 and the stylized-shading-sample image 414 to generate the style-fusion-sample image 428. As used in this disclosure, the term "style-fusion-sample image" refers to an image that blends features of different artistic styles and that is generated during training of a neural network. The style-fusion-sample image 428, for instance, represents an output image that blends edges of an edge-stroke style from the stylized-edge-sample image 412 and shading of a shading-stroke style from the stylized-shading-sample image 414. In other words, the style-fusion-sample image 428 comprises sample edges exhibiting the edge-stroke style and sample shading exhibiting the shading-stroke style.

After generating the style-fusion-sample image 428, the style-transfer system 100 can use the style-fusion-sample image 428 in determining one or both of an adversarial loss or a reconstruction loss. To determine an adversarial loss, in some embodiments, the style-transfer system 100 provides the style-fusion-sample image 428 and a real-style-fusion drawing 430 to a discriminator-neural network 432. Consistent with the disclosure above, the discriminator-neural network 432 may be a CNN, such as the convolutional "PatchGAN" classifier described in Isola. The discriminator-neural network 432 and the multi-branch-style-transfer network 400 together form a GAN.

As used in this disclosure, the term "real-style-fusion drawing" refers to a drawing that includes features drawn with authentic strokes in multiple stroke styles. In particular, a real-style-fusion drawing refers to a drawing comprising both edges drawn with authentic strokes in a particular edge-stroke style and shading drawn with authentic strokes in a particular shading-stroke style. As shown in FIG. 4A, for example, the real-style-fusion drawing 428 includes (i) edges drawn with strokes in the same edge-stroke style as the stylized-edge-sample image 412 and (ii) shading drawn with strokes in the same shading-stroke style as the stylized-shading-sample image 414. In one or more embodiments the real-style-fusion drawing comprises the fusion-stroke-training image 402. In alternative embodiments, the real-style-fusion drawing comprises a different drawing.

As further depicted in FIG. 4A, the discriminator-neural network 432 generates realism indicators 434 for the style-fusion-sample image 428 and the real-style-fusion drawing 430. In some embodiments, the realism indicators 434 indicate whether the discriminator-neural network 432 identifies the style-fusion-sample image 428 or the real-style-fusion drawing 430 as real—that is, by identifying either the style-fusion-sample image 428 or the real-style-fusion drawing 430 as appearing to include more realistic strokes. In some such embodiments, the realism indicators 434 identify the style-fusion-sample image 428 as real or fake using a first expected error and identifies the real-style-fusion drawing 430 as real or fake using a second expected error.

After the discriminator-neural network 432 generates the realism indicators, in some embodiments, the style-transfer system 100 determines an adversarial loss from an adversarial-loss function 436. For instance, in certain implementations, the style-transfer system 100 uses equation (3) to determine an adversarial loss for the shading-style-transfer-neural network 308. When applying equation (3) in this context, the multi-branch-style-transfer network 400 represents the generator G, and the discriminator-neural network 432 represents the discriminator D. During the training iteration described above, the style-transfer system 100 inputs the fusion-stroke-training image 402 (as the observed input image x) into (i) the first NPR generator 404a corresponding to the edge-style-transfer-neural network 408 and (ii) the second NPR generator 404b corresponding to the shading-style-transfer-neural network 410. Based on the stylized-edge-sample image 412 from the edge-style-transfer-neural network 408 and the stylized-shading-sample image 414 from the shading-style-transfer-neural network 410, the style-fusion-neural network 416 generates the training-fusion map 426 and the style-fusion-sample image 428 (the latter of which as the output of the generator G). The style-transfer system 100 further inputs the style-fusion-sample image 428 (i.e., the output of G, z)) and the real-style-fusion drawing 430 (i.e., real drawing r) into the discriminator-neural network 432.

Continuing the application of equation (3), upon receiving the style-fusion-sample image 428 and the real-style-fusion drawing 430, the discriminator-neural network 432 generates the realism indicators 434 to classify the style-fusion-sample image 428 (i.e., the output of the generator G) and the real-style-fusion drawing 430 (i.e., the real drawing r) as either real or fake. By implementing equation (3), the style-transfer system 100 trains (i) the style-fusion-neural network 416 to generate style-fusion-sample images that the discriminator-neural network 432 cannot distinguish from real-style-fusion drawings and (ii) the discriminator-neural network 432 to detect the style-fusion-sample images as fake. In the alternative to equation (3), the style-transfer system 100 can utilize other loss functions for the adversarial-loss function 436.

In addition (or in the alternative) to determining an adversarial loss, in some embodiments, the style-transfer system 100 determines a reconstruction loss when training the style-fusion-neural network 416. As shown in FIG. 4A, for example, the style-transfer system 100 determines a reconstruction loss from a reconstruction-loss function 438 based on a comparison of the fusion-stroke-training image 402 and the style-fusion-sample image 428. By determining a reconstruction loss from the reconstruction-loss function 438, in some embodiments, the style-transfer system 108 determines an L1 distance between the fusion-stroke-training image 402 and the style-fusion-sample image 428.

In some embodiments, the style-transfer system 100 applies equation (4) to determine a reconstruction loss for the multi-branch-style-transfer network 400. As indicated by equation (4), to determine the loss $\mathcal{L}_{L1}$ for the generator G, the style-transfer system 100 determines a distance between the style-fusion-sample image 428 (as the output image y) and the output of the multi-branch-style-transfer network 400, where the fusion-stroke-training image 402 (as the observed input image x) and a random Gaussian noise vector z are input into the multi-branch-style-transfer network 400 to form the inputs for the generator G (i.e., G(x,z)). In the alternative to equation (4), the style-transfer system 100 can utilize a variety of other loss functions for the reconstruction-loss function 324, including, for example, L2 loss.

Upon determining one or both of an adversarial loss and a reconstruction loss, the style-transfer system 100 adjusts network parameters (e.g., weights or values) of one or both of the style-fusion-neural network 416 and the discriminator-neural network 432. For example, the style-transfer system 100 may increase or decrease weights or values of the style-fusion-neural network 416 to reduce the loss in a subsequent training iteration.

In some such embodiments, the style-transfer system 100 combines both an adversarial loss and a reconstruction loss into an objective that guides adjusting the network parameters of the style-fusion-neural network 416 and the discriminator-neural network 432, such as by following the objective in equation (5). In certain implementations, the style-transfer system 100 continues to perform such training iterations until satisfying a convergence criteria (e.g., according to the objective in equation (5)).

In addition to the foregoing, the style-transfer system 100 can generate stylized-shading images of differing styles or combinations thereof. To enable this flexibility, the style-transfer system 100 can train the network(s) using fusion-stroke training images 440 with differing styles or combinations of styles to allow the style-transfer system 100 to learn how to reconstruct various styles and combinations of styles.

Figure 4B:
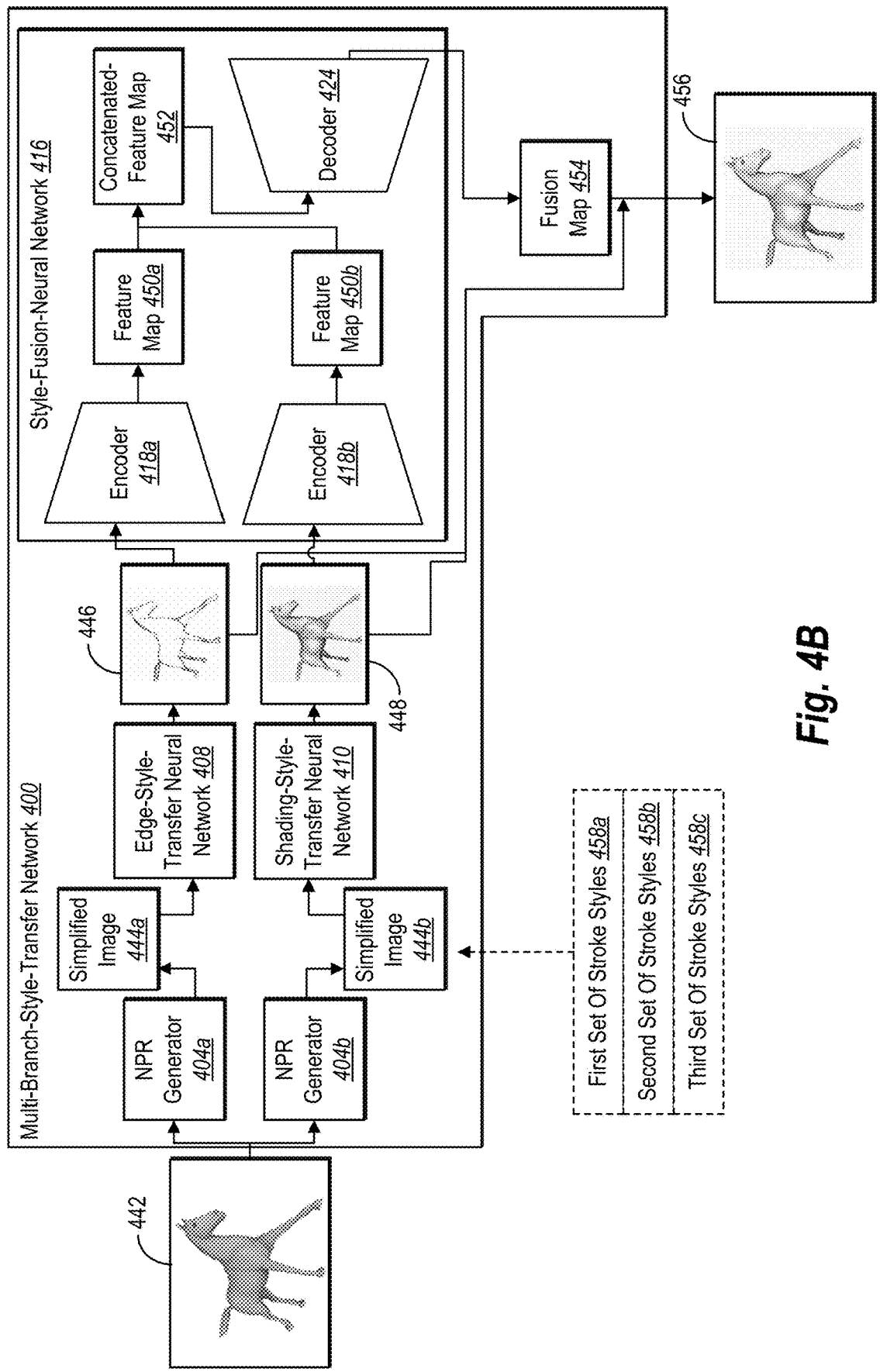
FIG. 4B illustrates the style-transfer system utilizing a style-fusion-neural network to generate a style-fusion image exhibiting an edge-stroke style and a shading-stroke style in accordance with one or more embodiments.

In addition (or in the alternative) to training the multi-branch-style-transfer network 400 and the style-fusion-neural network 416, in some embodiments, the style-transfer system 100 applies the multi-branch-style-transfer network 400 and the style-fusion-neural network 416 to generate style-fusion images. FIG. 4B illustrates one such application. In general, FIG. 4B illustrates the style-transfer system 100 providing a source image 442 to the first NPR generator 404a and using the edge-style-transfer-neural network 408 to generate a stylized-edge image 446. As further illustrated in FIG. 4B, the style-transfer system 100 also provides the source image 442 to the second NPR generator 404b and uses the shading-style-transfer-neural network 410 to generate a stylized-shading image 448. In response to providing both the stylized-stroke images to the style-fusion-neural network 416, the style-transfer system 100 generates a fusion map 454 for a style-fusion image 456.

As shown in FIG. 4B, the style-transfer system 100 provides the source image 442 to both the first NPR generator 404a corresponding to the edge-style-transfer-neural network 408 and to the second NPR generator 404b corresponding to the shading-style-transfer-neural network 410. The first NPR generator 404a and the second NPR generator 404b respectively generate a simplified image 444a of the source image 442 and a simplified image 444b of the source image 442. Based on the simplified image 444a from the first NPR generator 404a, the edge-style-transfer-neural network 408 generates a stylized-edge image 446. Similarly, based on the simplified image 444b from the second NPR generator 404b, the shading-style-transfer-neural network 410 generates a stylized-shading image 448. As shown in FIG. 4B, the stylized-edge image 446 corresponds to the source image 442 and comprises edges exhibiting an edge-stroke style. The stylized-shading image 448 also corresponds to the source image 442, but comprises shading exhibiting a shading-stroke style.

After generating such stylized-stroke images, the style-transfer system 100 provides the stylized-edge image 446 and the stylized-shading image 448 to the style-fusion-neural network 416. As indicated by FIG. 4B, the first encoder 418a extracts a feature map 450a from the stylized-edge image 446. Similarly, the second encoder 418b extracts a feature map 450b from the stylized-shading image 448. The feature map 450a and the feature map 450b include features representing edges and contrast abstraction from the stylized-edge image 446 and the stylized-shading image 448, respectively. The style-transfer system 100 subsequently concatenates the feature maps 450a and 450b to generate a concatenated-feature map 452.

As further shown in FIG. 4B, the style-transfer system 100 provides the concatenated-feature map 452 to the decoder 424 of the style-fusion-neural network 416. The decoder 424 then decodes the concatenated-feature map 452 to generate the fusion map 454. The style-transfer system 100 subsequently applies the fusion map 454 to both the stylized-edge image 446 and the stylized-shading image 448 to generate the style-fusion image 456. As shown in FIG. 4B, the style-fusion image 456 corresponds to the source image 442, comprises edges exhibiting an edge-stroke style, and comprises shading exhibiting a shading-stroke style.

As suggested above, in some embodiments, the style-transfer system 100 can apply the multi-branch-style-transfer network 400 to generate a style-fusion image exhibiting a variety of edge-stroke styles or shading-stroke styles selected by a user. As indicated in FIG. 4A, for instance, the style-transfer system 100 can train the multi-branch-style-transfer network 400 to generate style-fusion images exhibiting different edge-stroke styles and different shading-stroke styles. FIG. 4B depicts different sets of edge-stroke styles and shading-stroke styles that the style-transfer system 100 can implement as a result of such training.

In particular, FIG. 4B illustrates a first set of stroke styles 458a, a second set of stroke styles 458b, and a third set of stroke styles 458c from which a user of the style-transfer system 100 may select. Each of the first set of stroke styles 458a, the second set of stroke styles 458b, and the third set of stroke styles 458c include a different combination of an edge-stroke style and a shading-stroke style. In some such embodiments, the style-transfer system 100 provides a client device a stroke-style setting corresponding to each of the first set of stroke styles 458a, the second set of stroke styles 458b, and the third set of stroke styles 458c for display within a user interface.

In certain implementations, the style-transfer system 100 receives an indication of a user selection from the client device of a stroke-style setting corresponding to a set of stroke styles from among the sets of stroke styles 458a-458c. Based on receiving the indication of the user selection of the stroke-style setting, the style-transfer system 100 generates the style-fusion image 456 comprising edges and shading exhibiting the corresponding edge-stroke style and shading-stroke style, respectively. For illustrative purposes, FIG. 4B depicts the style-fusion image 456 exhibiting one such set of stroke styles. But the style-transfer system 100 can generate style-fusion images in a variety of stroke styles according to user selection.

As noted above, in some embodiments, the style-transfer system 100 improves upon the accuracy and realism with which existing image-style-conversion systems generate images exhibiting a stroke style. As an example of such an improvement, FIG. 5 illustrates a comparison of the style-transfer system 100 generating a stylized-edge image 506 from a source image 502 and conventional modules generating simplified NPR images in accordance with one or more embodiments.

Figure 5:
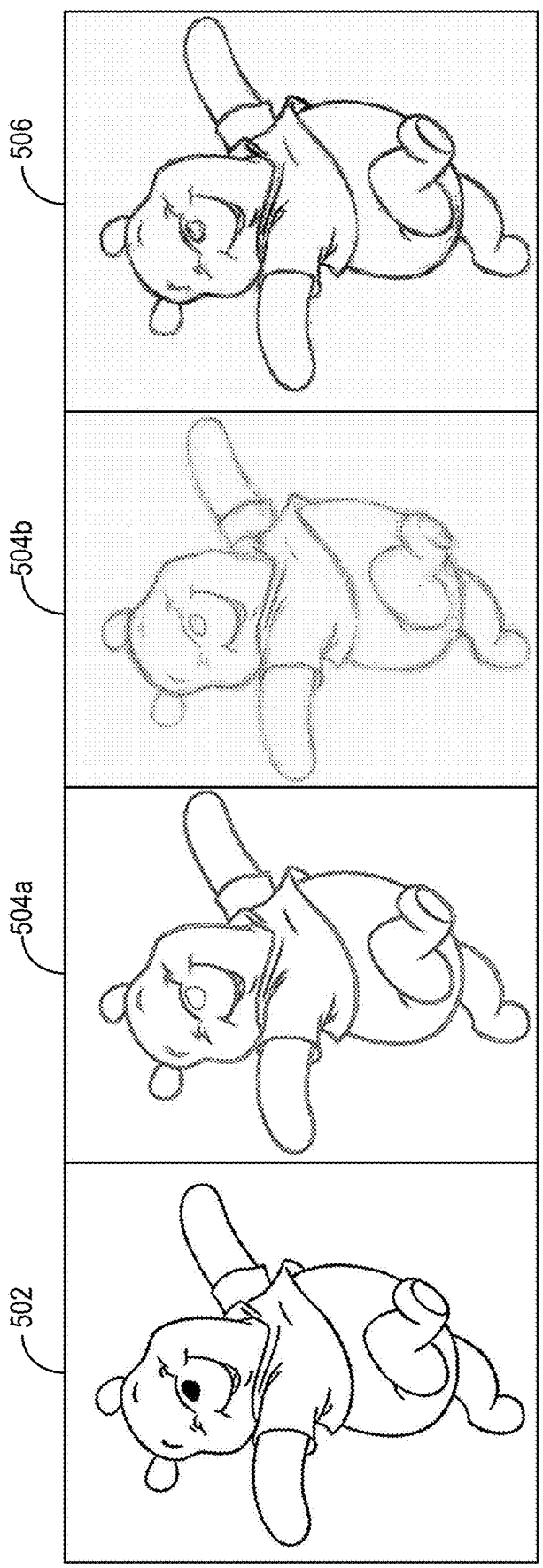
FIG. 5 illustrates a comparison of a stylized-edge image and simplified NPR images generated from a source image in accordance with one or more embodiments.

As FIG. 5 suggests, the style-transfer system 100 input the source image 502 into an NPR generator corresponding to an edge-style-transfer-neural network. Consistent with the disclosure above, the NPR generator generated a simplified image of the source image 502, and the edge-style-transfer-neural network generated the stylized-edge image 506. For purposes of comparison, researchers input the source image 502 into an existing NPR module described by Lu and an existing NPR module described by Edgar Simo-Serra et al., "Mastering Sketching: Adversarial Augmentation for Structured Prediction," ACM Transactions on Graphics, Vol. 37, Issue No. 1 (2018) (hereinafter "Simo-Serra"). Both the NPR modules were trained using conventional line-pencil-paired data and not the improved training process depicted in FIG. 2A. Based on the source image 502, the existing NPR module from Lu generated output image 504a, and the existing NPR module from Simo-Serra generated output image 504b.

As shown in FIG. 5, the stylized-edge image 506 includes edges with more accurate and authentic looking strokes than the output images 504a and 504b. In particular, the stylized-edge image 506 includes crossing marks and smudge marks in edges of an object (i.e., a cartoon figure) that both the output images 504a and 504b do not include. Rather than the realistic edge-stroke style shown in the stylized-edge image 506, the output image 504a includes double-lined edges that do not authentically mimic artistic strokes. Rather than the crisper edge-stroke style shown in the stylized-edge image 506, the output image 504b includes blurry strokes.

Figure 6:
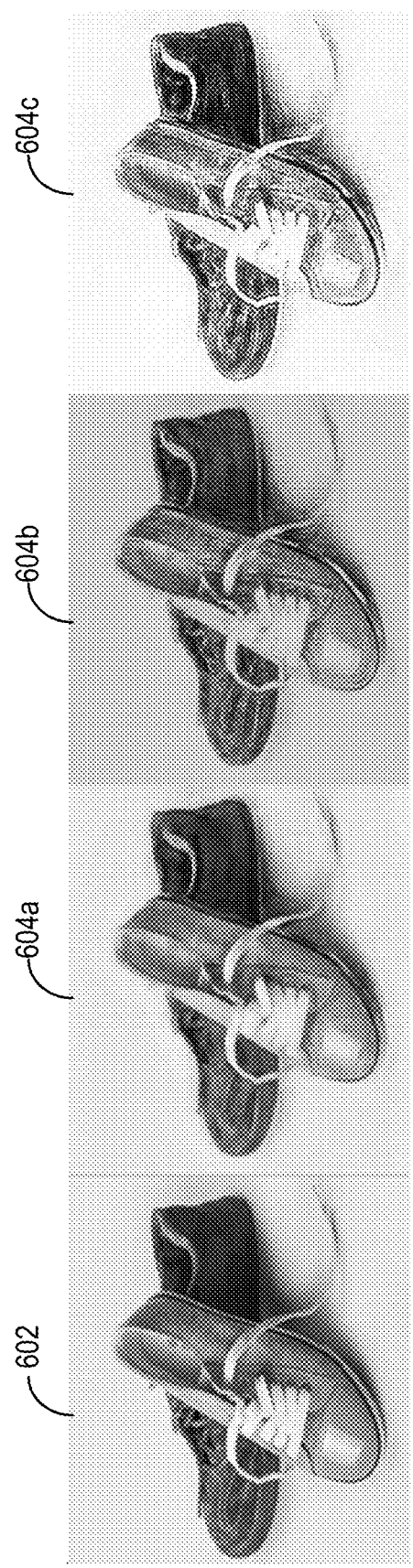
FIG. 6 illustrates stylized-shading images of a source image comprising shading that exhibits different shading-stroke styles in accordance with one or more embodiments.

As also noted above, in certain implementations, the style-transfer system 100 improves the flexibility with which existing image-style-conversion systems render images exhibiting different stroke styles. Unlike some existing image-style-conversion systems with fixed output styles, for instance, the style-transfer system 100 can generate stylized-stroke images exhibiting a variety of different stroke styles. FIG. 6 illustrates examples of different shading-stroke styles in stylized-stroke images that the style-transfer system 100 generates.

In particular, FIG. 6 depicts a source image 602 that the style-transfer system 100 input into an NPR generator corresponding to a shading-style-transfer-neural network. Based on a user selection of different shading settings or stroke-style settings, the NPR generator generated simplified images of the source image 602, and the shading-style-transfer-neural network generated stylized-shading images 604a-604c. As depicted in FIG. 6, the stylized-shading image 604a exhibits a first shading-stroke style, the stylized-shading image 604b exhibits a second shading-stroke style, and the stylized-shading image 604c exhibits a third shading-stroke style. Each of the stylized-shading images 604a-604c exhibit a different shading-stroke style in a given artistic medium (e.g., pencil). As noted above, in some embodiments, the style-transfer system 100 can generate stylized-shading images exhibiting shading-stroke styles in different artistic mediums.

In addition (or in the alternative) to improved flexibility in portraying different stroke styles, in some embodiments, the style-transfer system 100 more realistically synthesizes images of multiple stroke styles into a style-fusion image than existing image-style-conversion systems. As an example of such an improvement, FIG. 7 illustrates a comparison of the style-transfer system 100 generating a style-fusion image 710 corresponding to a source image 702 and a conventional NPR module generating a superimposed image 708 corresponding to the source image 702 in accordance with one or more embodiments.

Figure 7:
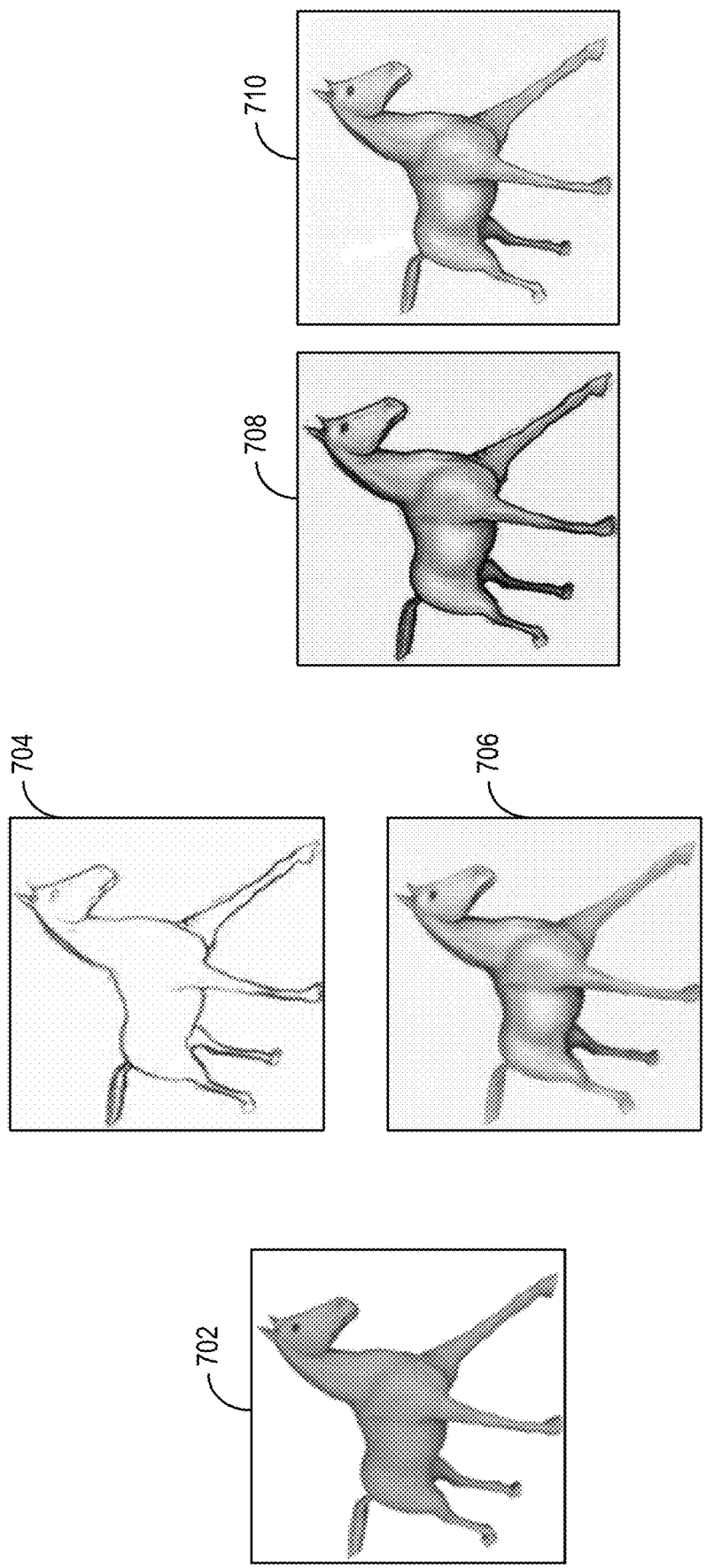
FIG. 7 illustrates a comparison of a style-fusion image generated by the style-transfer system and a composite image generated by superimposing a stylized-edge image and a stylized-shading image in accordance with one or more embodiments.

As indicated by FIG. 7, researchers input a stylized-edge image 704 and a stylized-shading image 706 into a conventional NPR module that superimposes one image over another image using multiplication. The conventional NPR module generated the superimposed image 708 by superimposing the stylized-edge image 704 over the stylized-shading image 706 (or vice versa). In contrast to the style-fusion image 710, the superimposed image 708 depicts an unrealistic blend of the stylized-edge image 704 and the stylized-shading image 706. The edges and shading in the superimposed image 708 appear rougher and opaquer, respectively, than corresponding edges and shading in the style-fusion image 710.

Consistent with the disclosure above, the style-transfer system 100 input the stylized-edge image 704 and the stylized-shading image 706 into a style-fusion-neural network to generate a fusion map for the style-fusion image 710. The style-transfer system 100 further applied the fusion map to the stylized-edge image 704 and the stylized-shading image 706 to generate the style-fusion image 710. In contrast to the superimposed image 708, the style-fusion image 710 depicts a more realistic blend of the stylized-edge image 704 and the stylized-shading image 706. The edges and the shading in the style-fusion image 710 appear cleaner and clearer, respectively, than corresponding edges and shading in the superimposed image 708. Further, the edges and shading in the style-fusion image 710 more realistically resemble strokes of the edge-stroke style from the stylized-edge image 704 and strokes of the shading-stroke style from the stylized-shading image 706.

Independent of improved stroke-style flexibility or improved style fusion, in some embodiments, the style-transfer system 100 improves the flexibility with which existing image-style-conversion systems render images exhibiting stroke styles from different source images. As suggested above, some conventional image-style-conversion systems cannot convert natural photographs into output images that realistically resemble a stroke style. In contrast to the source-input limits of such conventional image-style-conversion systems, FIGS. 8A and 8B illustrate the style-transfer system 100 generating style-fusion images corresponding to natural photographs as source images in accordance with one or more embodiments.

As suggested by FIG. 8A, the style-transfer system 100 input a natural photograph 802a as a source image into a multi-branch-style-transfer network. In this example, the natural photograph 802a captures natural lighting and natural objects (e.g., sunlight and plants). Consistent with the disclosure above, the multi-branch-style-transfer network generated a style-fusion image 804a corresponding to the natural photograph 802a. Despite receiving the natural photograph 802a as an input, the style-transfer system 100 generated the style-fusion image 804a comprising edges exhibiting a target edge-stroke style and shading exhibiting a target shading-stroke style both locally and holistically.

Similarly, as suggested by FIG. 8B, the style-transfer system 100 input a natural photograph 802b as a source image into the multi-branch-style-transfer network. In this example, the natural photograph 802b captures artificial lighting and manmade objects (e.g., electric light and a car). The multi-branch-style-transfer network generated a style-fusion image 804b corresponding to the natural photograph 802b. Despite receiving the natural photograph 802b as an input with different lighting and objects, the style-transfer system 100 again generated the style-fusion image 804b comprising edges exhibiting a target edge-stroke style and shading exhibiting a target shading-stroke style both locally and holistically.

Figure 9:
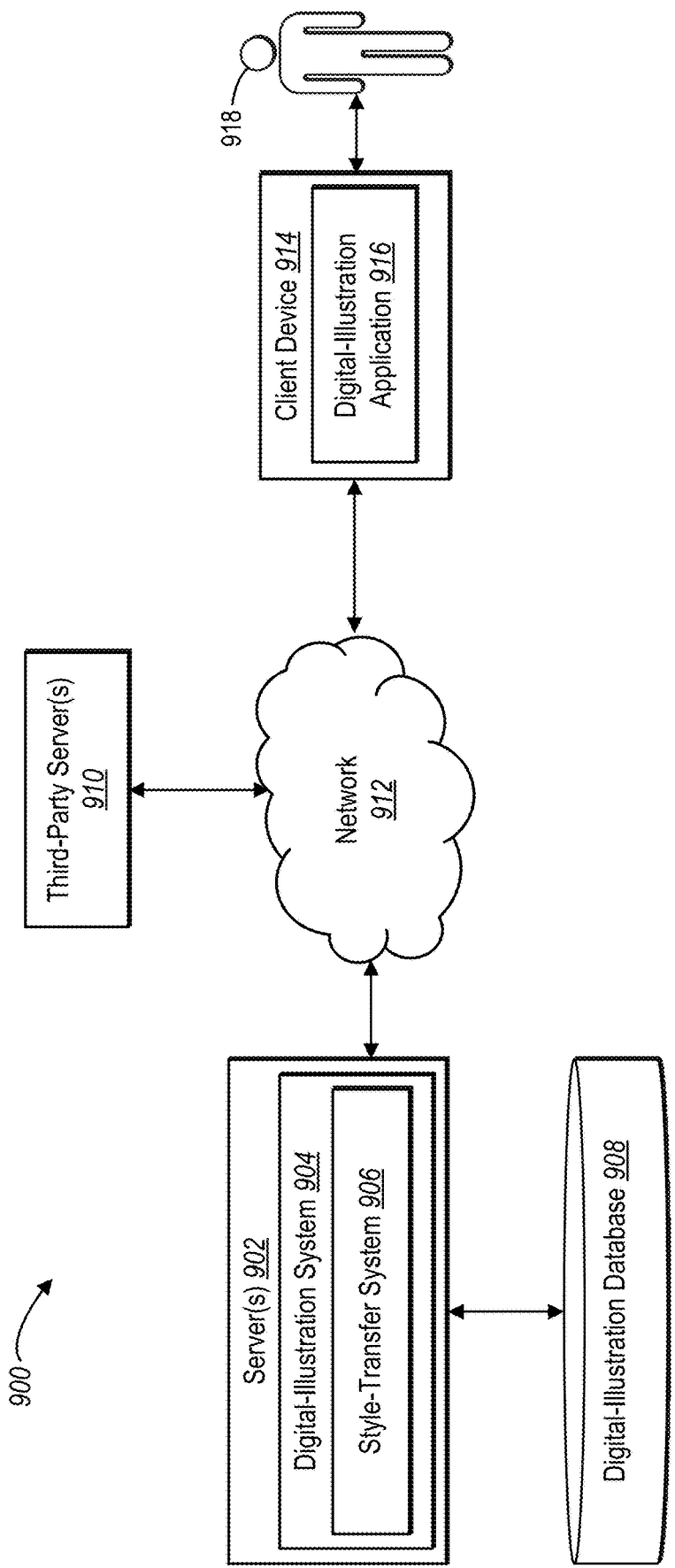
FIG. 9 illustrates a block diagram of an environment in which the style-transfer system can operate in accordance with one or more embodiments.
Figure 10:
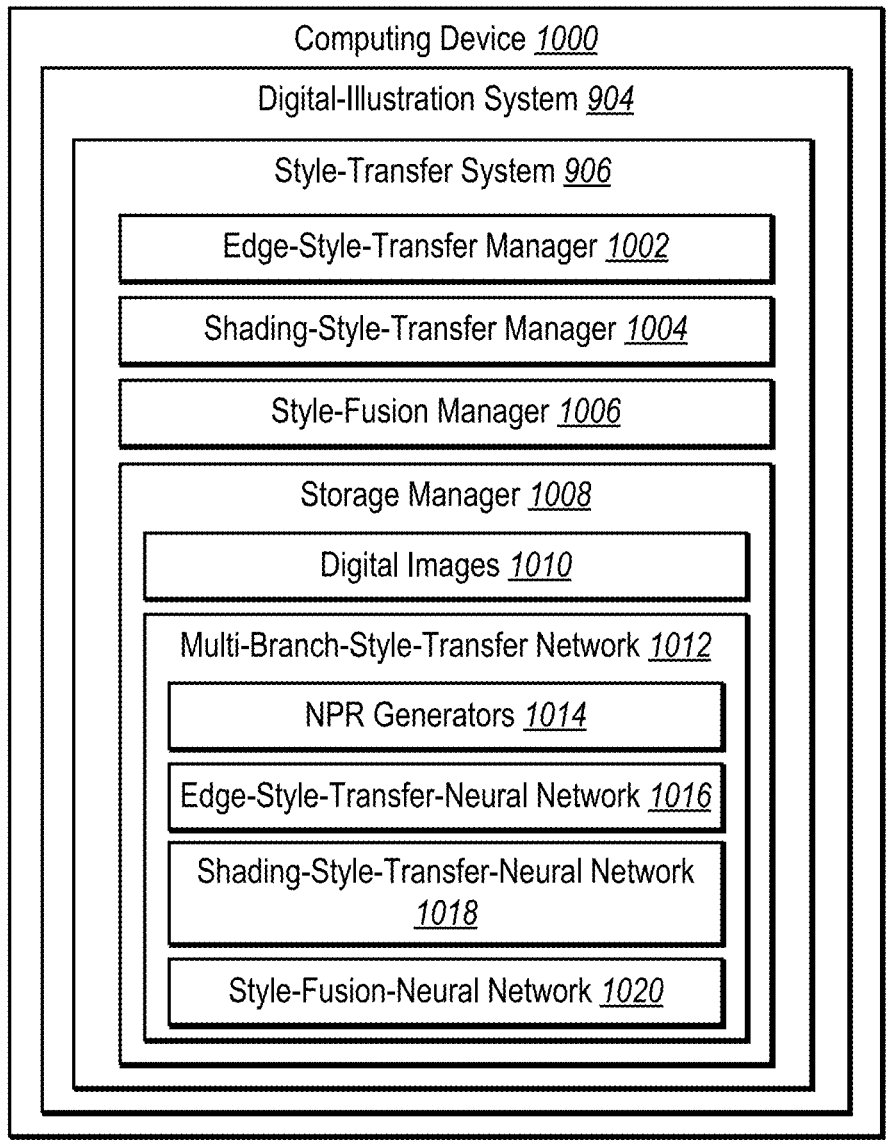
FIG. 10 illustrates a schematic diagram of the style-transfer system of FIG. 9 in accordance with one or more embodiments.

Turning now to FIGS. 9 and 10, these figures provide an overview of an environment in which a style-transfer system can operate and an example of an architecture for the style-transfer system. In particular, FIG. 9 depicts a block diagram illustrating an exemplary system environment ("environment") 900 in which a style-transfer system 906 can operate in accordance with one or more embodiments. Specifically, FIG. 9 illustrates the environment 900 comprising server(s) 902, third-party server(s) 910, a network 912, a client device 914, and a user 918 associated with the client device 914. Although FIG. 9 illustrates one client device and one user, in alternative embodiments, the environment 900 can include any number of computing devices and associated users. Similarly, although FIG. 9 illustrates a particular arrangement of the server(s) 902, the third-party server(s) 910, the network 912, the client device 914, and the user 918, various additional arrangements are possible.

As shown in FIG. 9, the server(s) 902, the third-party server(s) 910, the network 912, and the client device 914 may be communicatively coupled with each other either directly or indirectly, such as coupling through the network 912, which is described further below in relation to FIG. 13. The server(s) 902 and the client device 914 may include any type of computing device, including one or more computing devices as discussed further below in relation to FIG. 13.

As depicted in FIG. 9, the server(s) 902 can generate, store, receive, and/or transmit any type of data, including inputs of source images or stroke-training images into neural networks or user inputs selecting a stroke-style setting. For example, the server(s) 902 can receive a user input identifying a source image from the client device 914 and then utilize a stroke-style-transfer-neural network (and corresponding NPR generator) to generate a stylized-stroke image corresponding to the source image. As a further example, the server(s) 902 can receive a user input identifying a source image from the client device 914 and then utilize a multi-branch-style-transfer network to generate a style-fusion image corresponding to the source image. In some embodiments, the server(s) 902 comprise a data server, a communication server, or a web-hosting server.

As further shown in FIG. 9, the server(s) 902 can include a digital-illustration system 904. In general, the digital-illustration system 904 facilitates the generation, modification, sharing, accessing, storing, and/or deletion of digital content (e.g., digital images or digital videos). For example, the digital-illustration system 904 can use the server(s) 902 to generate new digital images or modify existing digital images. In certain implementations, the digital-illustration system 904 uses the server(s) 902 to receive user inputs identifying source images, stroke-training images, or stroke-style settings from the client device 914 or transmit data representing source images, stylized-stroke images, or style-fusion images to the client device 914.

In addition to the digital-illustration system 904, the server(s) 902 include the style-transfer system 906. The style-transfer system 906 is an embodiment (and can perform the functions, methods, and processes) of the style-transfer system 100 described above. In some embodiments, for example, the style-transfer system 906 uses the server(s) 902 to provide a source image to an NPR generator corresponding to a style-transfer-neural network. The style-transfer system 906 further uses the server(s) 902 to apply the NPR generator to the source image to generate a simplified image of the source image. In certain implementations, the style-transfer system 906 further uses the server(s) 902 to (i) extract a feature map from the simplified image using an encoder of the style-transfer-neural network and (ii) decode the feature map using a decoder of the style-transfer-neural network to generate a stylized-stroke image that both corresponds to the source image and exhibits a target stroke style.

As suggested by previous embodiments, the style-transfer system 906 can be implemented in whole or in part by the individual elements of the environment 900. Although FIG. 9 illustrates the style-transfer system 906 implemented within the server(s) 902, components of the style-transfer system 906 can be implemented in other components of the environment 900. For instance, in some embodiments, the client device 914 comprises the style-transfer system 906 and performs all of the functions, methods, and processes of the style-transfer system 906 described above and below. This disclosure describes the components of the style-transfer system 906 further below with regard to FIG. 10.

As further shown in FIG. 9, in some embodiments, the client device 914 comprises a computing device that allows the user 918 to send and receive digital communications. For example, the client device 914 can include a desktop computer, laptop computer, smartphone, tablet, or other electronic device. In some embodiments, the client device 914 further includes one or more software applications (e.g., a digital-illustration application 916) that allows a user 918 to send and receive digital communications. For example, the digital-illustration application 916 can be a software application installed on the client device 914 or a software application hosted on the server(s) 902. When hosted on the server(s) 902, the digital-illustration application 916 may be accessed by the client device 914 through another application, such as a web browser. In some implementations, the digital-illustration application 916 includes instructions that, when executed by a processor, cause the client device 914 to present one or more graphical user interfaces, such as user interfaces comprising source images and/or stroke-style settings for the user 918 to select and for the style-transfer system 906 to include as inputs when generating stylized-stroke images or fusion images.

As also illustrated in FIG. 9, the digital-illustration system 904 is communicatively coupled to the digital-illustration database 908. In one or more embodiments, the digital-illustration system 904 accesses and queries data from the digital-illustration database 908 associated with requests from the style-transfer system 906. For instance, the digital-illustration system 904 may access source images, stroke-training images, stylized-stroke images, or style-fusion images for the style-transfer system 906. As shown in FIG. 9, the digital-illustration database 908 is separately maintained from the server(s) 902. Alternatively, in one or more embodiments, the digital-illustration system 904 and the digital-illustration database 908 comprise a single combined system or subsystem within the server(s) 902.

Turning now to FIG. 10, this figure provides additional detail regarding components and features of the style-transfer system 906. In particular, FIG. 10 illustrates a computing device 1000 implementing the digital-illustration system 904 and the style-transfer system 906. In some embodiments, the computing device 1000 comprises one or more servers (e.g., the server(s) 902). In other embodiments, the computing device 1000 comprises one or more client devices (e.g., the client device 914).

As shown in FIG. 10, the computing device 1000 includes the digital-illustration system 904. In some embodiments, the digital-illustration system 904 uses its components to provide tools for generating new digital images or modifying existing digital images within a user interface of the digital-illustration application 916. Additionally, in some cases, the digital-illustration system 904 facilitates the generation, modification, sharing, accessing, storing, and/or deletion of digital content (e.g., digital images or digital videos).

As further shown in FIG. 10, the computing device 1000 includes the style-transfer system 906. The style-transfer system 906 includes, but is not limited to, an edge-style-transfer manager 1002, a shading-style-transfer manager 1004, a style-fusion manager 1006, and/or a storage manager 1008. The following paragraphs describe each of these components in turn.

As just mentioned, the style-transfer system 906 includes the edge-style-transfer manager 1002. The edge-style-transfer manager 1002 trains, manages, and applies an edge-style-transfer-neural network 1016. For example, in some embodiments, the edge-style-transfer manager 1002 inputs edge-stroke-training images into an NPR generator corresponding to the edge-style-transfer-neural network 1016 and trains the edge-style-transfer-neural network 1016 to generate stylized-edge-sample images. Additionally, in some embodiments, the edge-style-transfer manager 1002 inputs source images into the NPR generator and applies the edge-style-transfer-neural network 1016 to generate stylized-edge images. In some such embodiments, the edge-style-transfer manager 1002 trains or applies the edge-style-transfer-neural network 1016 as illustrated in FIGS. 2A and 2B, respectively. In some cases, the edge-style-transfer manager 1002 further communicates with the storage manager 1008 to apply and/or access source images or edge-stroke-training images from digital images 1010, an NPR generator from NPR generators 1014, and/or the edge-style-transfer-neural network 1016.

As further shown in FIG. 10, the shading-style-transfer manager 1004 trains, manages, and applies a shading-style-transfer-neural network 1018. For example, in some embodiments, the shading-style-transfer manager 1004 inputs shading-stroke-training images into an NPR generator corresponding to the shading-style-transfer-neural network 1018 and trains the shading-style-transfer-neural network 1018 to generate stylized-shading-sample images.

Additionally, in some embodiments, the shading-style-transfer manager 1004 inputs source images into the NPR generator and applies the shading-style-transfer-neural network 1018 to generate stylized-shading images. In some such embodiments, the shading-style-transfer manager 1004 trains or applies the shading-style-transfer-neural network 1018 as illustrated in FIGS. 3A and 3B, respectively. The shading-style-transfer manager 1004 further communicates with the storage manager 1008 to apply and/or access source images or shading-stroke-training images from the digital images 1010, an NPR generator from the NPR generators 1014, and/or the shading-style-transfer-neural network 1018.

As further shown in FIG. 10, the style-fusion manager 1006 trains, manages, and applies a multi-branch-style-transfer network 1012 and a style-fusion-neural network 1020. For example, in some embodiments, the style-fusion manager 1006 inputs fusion-stroke-training images into a first NPR generator corresponding to the edge-style-transfer-neural network 1016 and into a second NPR generator corresponding to the shading-style-transfer-neural network 1018 and trains the style-fusion-transfer-neural network 1020 to generate style-fusion-sample images. Additionally, in some embodiments, the style-fusion manager 1006 inputs source images into the first and second NPR generators and applies the edge-style-transfer-neural network 1016, the shading-style-transfer-neural network 1018, and the style-fusion-transfer-neural network 1020 to generate style-fusion images. In some such embodiments, the style-fusion manager 1006 trains or applies the multi-branch-style-transfer network 1012 and the style-fusion-neural network 1020 as illustrated in FIGS. 4A and 4B, respectively. In some embodiments, the style-fusion manager 1006 further communicates with the storage manager 1008 to apply and/or access source images or fusion-stroke-training images from the digital images 1010, NPR generators from the NPR generators 1014, and/or the multi-branch-style-transfer network 1012.

In one or more embodiments, each of the components of the style-transfer system 906 are in communication with one another using any suitable communication technologies. Additionally, the components of the style-transfer system 906 can be in communication with one or more other devices including one or more client devices described above. Although the components of the style-transfer system 906 are shown to be separate in FIG. 10, any of the subcomponents may be combined into fewer components, such as into a single component, or divided into more components as may serve a particular implementation. Furthermore, although the components of FIG. 10 are described in connection with the style-transfer system 906, at least some of the components for performing operations in conjunction with the style-transfer system 906 described herein may be implemented on other devices within the environment 900.

Each of the components 1002-1020 of the style-transfer system 906 can include software, hardware, or both. For example, the components 1002-1020 can include one or more instructions stored on a computer-readable storage medium and executable by processors of one or more computing devices, such as a client device or server device. When executed by the one or more processors, the computer-executable instructions of the style-transfer system 906 can cause the computing device(s) to perform the methods described herein. Alternatively, the components 1002-1020 can include hardware, such as a special-purpose processing device to perform a certain function or group of functions. Alternatively, the components 1002-1020 of the style-transfer system 906 can include a combination of computer-executable instructions and hardware.

Furthermore, the components 1002-1020 of the style-transfer system 906 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 1002-1020 may be implemented as a stand-alone application, such as a desktop or mobile application. Furthermore, the components 1002-1020 may be implemented as one or more web-based applications hosted on a remote server. The components 1002-1020 may also be implemented in a suite of mobile device applications or "apps." To illustrate, the components 1002-1020 may be implemented in a software application, including, but not limited to, ADOBE ILLUSTRATOR, ADOBE EXPERIENCE DESIGN, ADOBE CREATIVE CLOUD, ADOBE PHOTOSHOP, or ADOBE LIGHTROOM. "ADOBE," "ILLUSTRATOR," "EXPERIENCE DESIGN," "CREATIVE CLOUD," "PHOTOSHOP," and "LIGHTROOM" are either registered trademarks or trademarks of Adobe Inc. in the United States and/or other countries.

Figure 11:
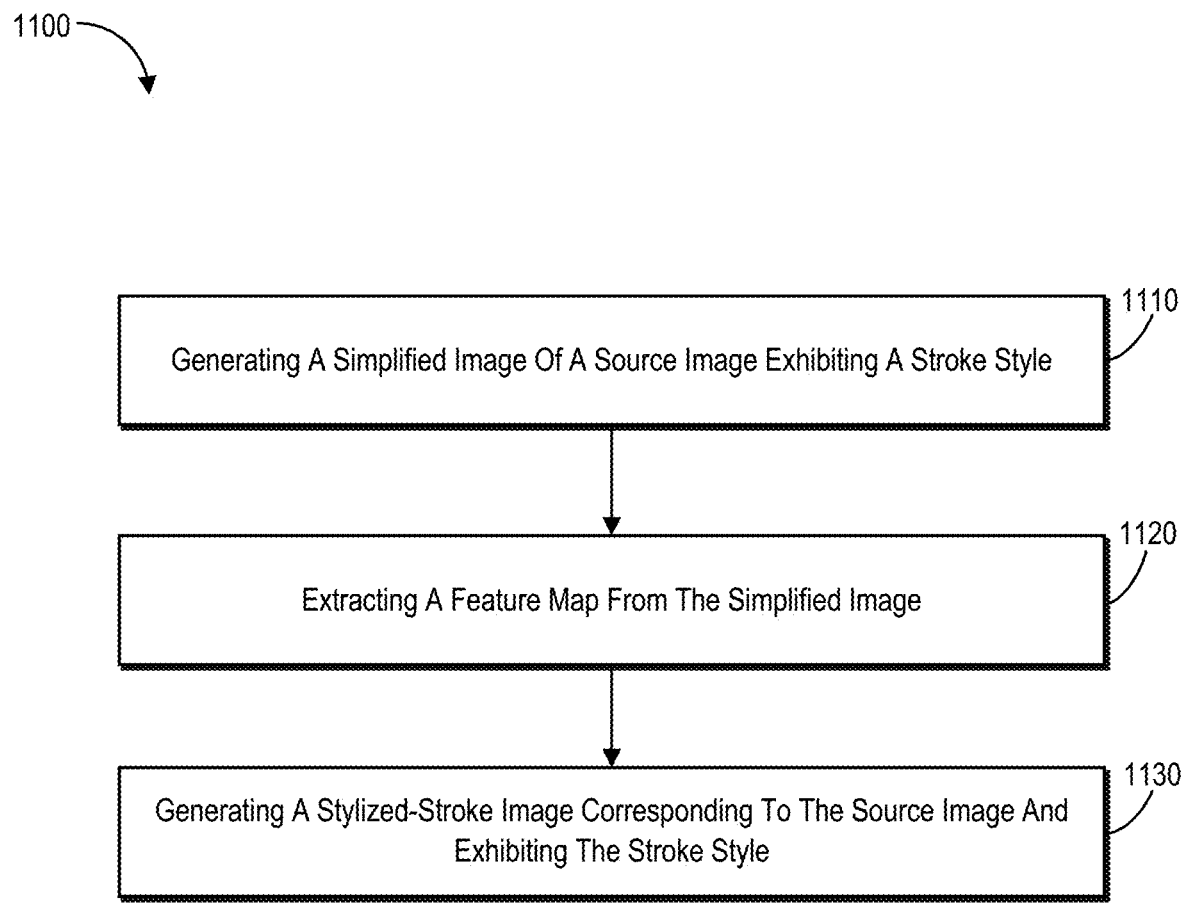
FIG. 11 illustrates a flowchart of a series of acts for generating a stylized-stroke image exhibiting a stroke style utilizing an NPR generator and a style-transfer-neural network in accordance with one or more embodiments.

Turning now to FIG. 11, this figure illustrates a flowchart of a series of acts 1100 of utilizing an NPR generator and a style-transfer-neural network to generate a stylized-stroke image corresponding to a source image and exhibiting a stroke style in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of generating a simplified image of a source image exhibiting a stroke style. In particular, in some embodiments, the act 1110 includes generating a simplified image of a source image utilizing a non-photorealistic-rendering ("NPR") generator corresponding to a style-transfer-neural network, the source image exhibiting a stroke style.

In some embodiments, the style-transfer-neural network comprises an edge-style-transfer-neural network trained to generate stylized-edge images exhibiting an edge-stroke style; and the stroke style comprises the edge-stroke style. By contrast, in certain implementations, the style-transfer-neural network comprises a shading-style-transfer-neural network trained to generate stylized-shading images exhibiting a shading-stroke style; and the stroke style comprises the shading-stroke style.

As suggested above, in some embodiments, generating the simplified image of the source image utilizing the NPR generator comprises: generating the simplified image comprising edge depictions from the source image utilizing a difference-of-gaussians operator; or generating the simplified image comprising a contrast abstraction from the source image utilizing an objective-abstraction function.

As further shown in FIG. 11, the acts 1100 include an act 1120 of extracting a feature map from the simplified image. In particular, in some embodiments, the act 1120 includes extracting a feature map from the simplified image utilizing an encoder of the style-transfer-neural network.

As further shown in FIG. 11, the acts 1100 include an act 1130 of generating a stylized-stroke image corresponding to the source image and exhibiting the stroke style. In particular, in certain implementations, the act 1130 includes generating a stylized-stroke image corresponding to the source image and exhibiting the stroke style by decoding the feature map utilizing a decoder of the style-transfer-neural network.

For example, in some embodiments, generating the stylized-stroke image comprises generating a stylized-edge image corresponding to the source image utilizing a decoder of the edge-style-transfer-neural network, the stylized-edge image comprising edges exhibiting the edge-stroke style. By contrast, in certain implementations, generating the stylized-stroke image comprises generating a stylized-shading image corresponding to the source image utilizing a decoder of the shading-style-transfer-neural network, the stylized-shading image comprising shading exhibiting the shading-stroke style.

In addition to the acts 1110-1130, the acts 1100 further include receiving an indication of a user selection of a stroke-style setting corresponding to the stroke style from among a first stroke-style setting and a second stroke-style setting; and based on receiving the indication of the user selection of the stroke-style setting, generate the stylized-stroke image exhibiting the stroke style. In some such embodiments, receiving the indication of the user selection of the stroke-style setting corresponding to the stroke style comprises receiving an indication of a user selection of a shading-style setting corresponding to a shading-stroke style from among a first shading-style setting and a second shading-style setting; and generating the stylized-stroke image exhibiting the stroke style comprises generating a stylized-shading image comprising shading exhibiting the shading-stroke style based on receiving the indication of the user selection of the shading-style setting.

Additionally, in one or more embodiments, the acts 1100 further include generating an additional simplified image of the source image utilizing an additional NPR generator corresponding to an edge-style-transfer-neural network; based on the additional simplified image, generating a stylized-edge image corresponding to the source image and comprising edges exhibiting an edge-stroke style by utilizing an edge-style-transfer-neural network; generating a fusion map for synthesizing stroke styles from the stylized-edge image and the stylized-shading image utilizing a style-fusion-neural network; and based on the fusion map, generating a style-fusion image comprising the edges exhibiting the edge-stroke style and the shading exhibiting the shading-stroke style.

As noted above, in some embodiments, the style-transfer system 100 trains a style-transfer-neural network. For instance, in certain implementations, the acts 1100 further include training the style-transfer-neural network by: generating a simplified-training image of a stroke-training image exhibiting the stroke style utilizing the NPR generator of the style-transfer-neural network; extracting a training-feature map from the simplified-training image utilizing the encoder of the style-transfer-neural network; based on the training-feature map, generating a stylized-stroke-sample image exhibiting the stroke style utilizing a decoder of the style-transfer-neural network; determining an adversarial loss from an adversarial-loss function based on a discriminator-neural network comparing the stylized-stroke-sample image and a real-stroke drawing; determining a reconstruction loss from a reconstruction-loss function based on a comparison of the stylized-stroke-sample image and the stroke-training image; and adjusting network parameters of the style-transfer-neural network based on the determined adversarial loss and the determined reconstruction loss.

In some such embodiments, generating the simplified-training image of the stroke-training image comprises generating the simplified-training image comprising edge depictions from an edge-stroke-training image utilizing an NPR generator corresponding to the edge-style-transfer-neural network; and generating the stylized-stroke-sample image comprises generating a stylized-edge-sample image exhibiting the edge-stroke style utilizing a decoder of the edge-style-transfer-neural network. By contrast, in some embodiments, generating the simplified-training image of the stroke-training image comprises generating the simplified-training image comprising a contrast abstraction from an shading-stroke-training image utilizing an NPR generator corresponding to the shading-style-transfer-neural network; and generating the stylized-stroke-sample image comprises generating a stylized-shading-sample image exhibiting the shading-stroke style utilizing a decoder of the shading-style-transfer-neural network.

In one or more embodiments, the acts 1100 further include providing the edge-stroke-training image exhibiting the edge-stroke style to the NPR module corresponding to the edge-style-transfer-neural network by randomly selecting a first edge-stroke-training image exhibiting a first edge-stroke style or randomly selecting a second edge-stroke-training image exhibiting a second edge-stroke style. Similarly, in some embodiments, the acts 1100 further include providing the shading-stroke-training image exhibiting the shading-stroke style to the NPR module corresponding to the shading-style-transfer-neural network by randomly selecting a first shading-stroke-training image exhibiting a first shading-stroke style or randomly selecting a second shading-stroke-training image exhibiting a second shading-stroke style.

Figure 12:
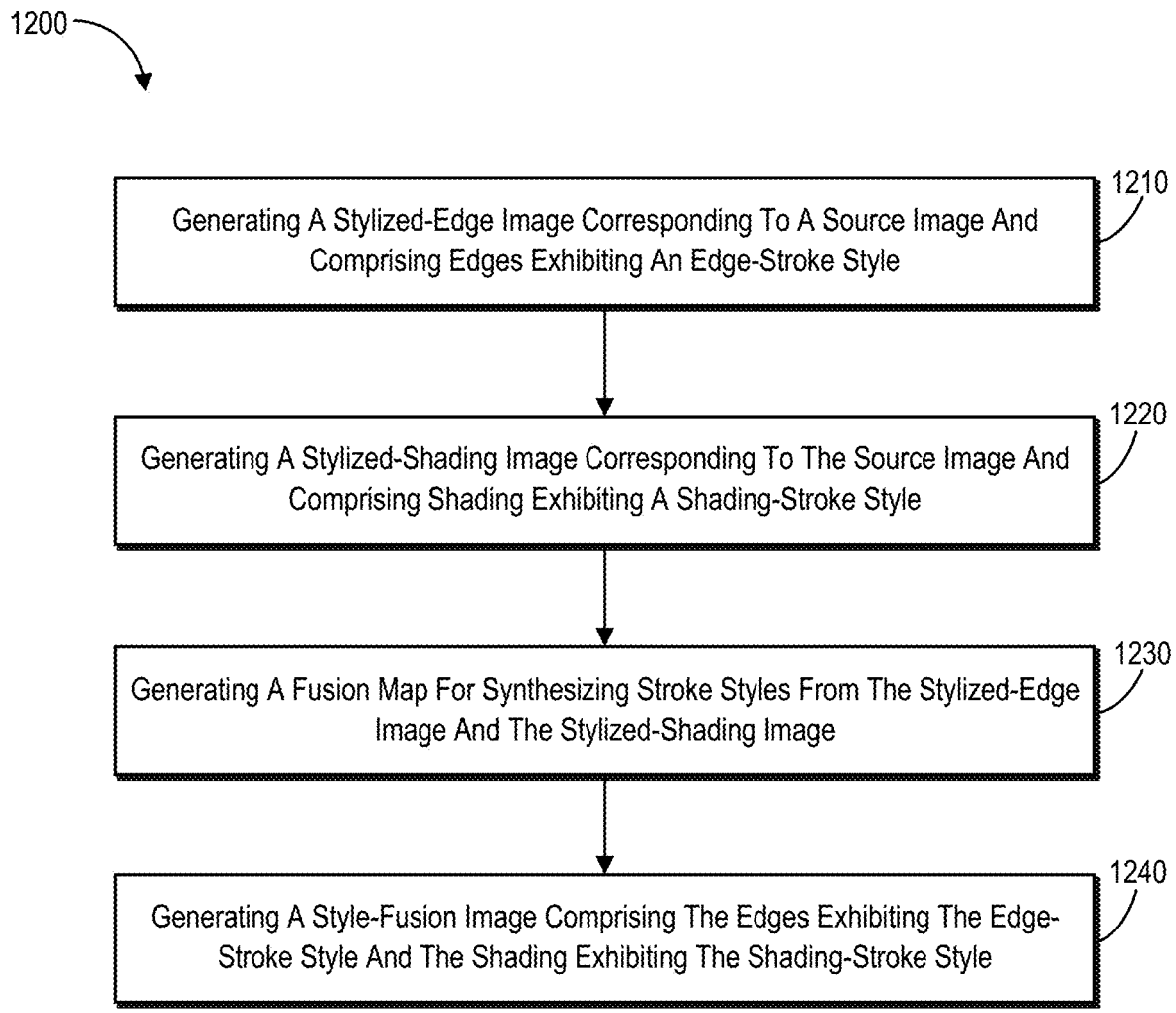
FIG. 12 illustrates a flowchart of a series of acts for generating a style-fusion image exhibiting multiple stroke styles in accordance with one or more embodiments.

Turning now to FIG. 12, this figure illustrates a flowchart of a series of acts 1200 of utilizing a style-fusion-neural network to generate a style-fusion image corresponding to a source image and exhibiting multiple stroke styles in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable storage medium can comprise instructions that, when executed by one or more processors, cause a computing device to perform the acts depicted in FIG. 12. In still further embodiments, a system can perform the acts of FIG. 12.

As shown in FIG. 12, the acts 1200 include an act 1210 of generating a stylized-edge image corresponding to a source image and comprising edges exhibiting an edge-stroke style. In particular, in some embodiments, the act 1210 includes generating a stylized-edge image corresponding to a source image and comprising edges exhibiting an edge-stroke style by utilizing a first NPR generator to generate a first simplified image and providing the first simplified image to an edge-style-transfer-neural network. In some such implementations, the edge-style-transfer-neural network comprises an encoder and a decoder.

As an example of the act 1210, in some embodiments, generating the stylized-edge image comprises: utilizing the first NPR generator to generate the first simplified image comprising edge depictions from the source image; extracting a feature map from the first simplified image utilizing the encoder of the edge-style-transfer-neural network; and generating the stylized-edge image corresponding to the source image and comprising edges exhibiting the edge-stroke style by decoding the feature map utilizing the decoder of the edge-style-transfer-neural network.

As further shown in FIG. 12, the acts 1200 include an act 1220 of generating a stylized-shading image corresponding to the source image and comprising shading exhibiting a shading-stroke style. In particular, in some embodiments, the act 1220 includes generating a stylized-shading image corresponding to the source image and comprising shading exhibiting a shading-stroke style by utilizing a second NPR generator to generate a second simplified image and providing the second simplified image to a shading-style-transfer-neural network. In some such embodiments, the shading-style-transfer-neural network comprises an encoder and a decoder.

As an example of the act 1220, in some embodiments, generating the stylized-shading image comprises: utilizing the second NPR generator to generate the second simplified image comprising a contrast abstraction from the source image; extracting a feature map from the second simplified image utilizing the encoder of the shading-style-transfer-neural network; and generating the stylized-shading image corresponding to the source image and comprising shading exhibiting the shading-stroke style by decoding the feature map utilizing the decoder of the edge-style-transfer-neural network.

As further shown in FIG. 12, the acts 1200 include an act 1230 of generating a fusion map for synthesizing stroke styles from the stylized-edge image and the stylized-shading image. In particular, in some embodiments, the act 1230 includes generating a fusion map for synthesizing stroke styles from the stylized-edge image and the stylized-shading image utilizing a style-fusion-neural network. In some such embodiments, the style-fusion-neural network comprises a first encoder, a second encoder, and a decoder.

As an example of the act 1230, in some embodiments, generating the fusion map for synthesizing the stroke styles from the stylized-edge image and the stylized-shading image comprises: extracting a first feature map from the stylized-edge image utilizing the first encoder of the style-fusion-neural network; extracting a second feature map from the stylized-shading image utilizing the second encoder of the style-fusion-neural network; concatenating the first feature map and the second feature map to generate a concatenated feature map; and based on the concatenated feature map, generating the fusion map for synthesizing the stroke styles from the stylized-edge image and the stylized-shading image utilizing the decoder of the style-fusion-neural network.

As further shown in FIG. 12, the acts 1200 include an act 1240 of generating a style-fusion image comprising the edges exhibiting the edge-stroke style and the shading exhibiting the shading-stroke style. In particular, in some embodiments, the act 1240 includes, based on the fusion map, generating a style-fusion image comprising the edges exhibiting the edge-stroke style and the shading exhibiting the shading-stroke style.

In addition to the acts 1210-1240, in certain implementations, the acts 1200 further include receiving an indication of a user selection of an edge-style setting corresponding to the edge-stroke style from among a first edge-style setting and a second edge-style setting; and based on receiving the indication of the user selection of the edge-style setting, generating the stylized-edge image comprising edges exhibiting the edge-stroke style. Similarly, in some embodiments, the acts 1200 further include receiving an indication of a user selection of a shading-style setting corresponding to the shading-stroke style from among a first shading-style setting and a second shading-style setting; and based on receiving the indication of the user selection of the shading-style setting, generating the stylized-shading image comprising shading exhibiting the shading-stroke style.

As noted above, in one or more embodiments, the style-transfer system trains an edge-style-transfer-neural network, a shading-style-transfer-neural network, or a style-fusion-neural network. For instance, in certain implementations, the acts 1200 further include training the edge-style-transfer-neural network by: utilizing the first NPR generator to generate a simplified-training image of an edge-stroke-training image, the edge-stroke-training image exhibiting the edge-stroke style and the simplified-training image comprising edge depictions from the edge-stroke-training image; extracting a training-feature map from the simplified-training image utilizing an encoder of the edge-style-transfer-neural network; based on the training-feature map, generating a stylized-edge-sample image comprising edges exhibiting the edge-stroke style utilizing a decoder of the edge-style-transfer-neural network; determining an adversarial loss from an adversarial-loss function based on a discriminator-neural network comparing the stylized-edge-sample image and a real-edge-stroke drawing; determining a reconstruction loss from a reconstruction-loss function based on a comparison of the stylized-edge-sample image and the edge-stroke-training image; and adjusting network parameters of the edge-style-transfer-neural network based on the determined adversarial loss and the determined reconstruction loss.

As a further example of training, in some embodiments, the acts 1200 further include training the shading-style-transfer-neural network by: utilizing the second NPR generator to generate a simplified-training image of a shading-stroke-training image, the shading-stroke-training image exhibiting the shading-stroke style and the simplified-training image comprising a contrast abstraction from the shading-stroke-training image; extracting a training-feature map from the simplified-training image utilizing an encoder of the shading-style-transfer-neural network; based on the training-feature map, generating a stylized-shading-sample image comprising shading exhibiting the shading-stroke style utilizing a decoder of the shading-style-transfer-neural network; determining an adversarial loss from an adversarial-loss function based on a discriminator-neural network comparing the stylized-shading-sample image and a real-shading-stroke drawing; determining a reconstruction loss from a reconstruction-loss function based on a comparison of the stylized-shading-sample image and the shading-stroke-training image; and adjusting network parameters of the shading-style-transfer-neural network based on the determined adversarial loss and the determined reconstruction loss.

As yet a further example of training, in some embodiments, the acts 1200 further include train the style-fusion-neural network by: generating a stylized-edge-sample image corresponding to a fusion-stroke-training image exhibiting the edge-stroke style and the shading-stroke style by utilizing the edge-style-transfer-neural network; extracting a first training-feature map from the stylized-edge-sample image utilizing a first encoder of the style-fusion-neural network; generating a stylized-shading-sample image corresponding to the fusion-stroke-training image by utilizing the shading-style-transfer-neural network; extracting a second training-feature map from the stylized-shading-sample image utilizing a second encoder of the style-fusion-neural network; concatenating the first training-feature map and the second training-feature map to generate a concatenated-training-feature map; based on the concatenated-training-feature map, generating a training-fusion map for synthesizing stroke styles from the stylized-edge-sample image and the stylized-shading-sample image utilizing a decoder of the style-fusion-neural network; based on the training-fusion map, generating a style-fusion-sample image comprising sample edges exhibiting the edge-stroke style and sample shading exhibiting the shading-stroke style; determining an adversarial loss from an adversarial-loss function based on a discriminator-neural network comparing the style-fusion-sample image and a real-style-fusion drawing; determining a reconstruction loss from a reconstruction-loss function based on a comparison of the style-fusion-sample image and the fusion-stroke-training image; and adjusting network parameters of the style-fusion-neural network based on the determined adversarial loss and the determined reconstruction loss.

In addition (or in the alternative) to the acts describe above, in some embodiments, the acts 1100 (or the acts 1200) include a step for training a multi-branch-style-transfer network to generate style-fusion-sample images exhibiting an edge-stroke style and a shading-stroke style based on fusion-stroke-training images and real-style-fusion drawings. For instance, the algorithms and acts described in reference to FIG. 4A can comprise the corresponding acts for performing a step for training a multi-branch-style-transfer network to generate style-fusion-sample images exhibiting an edge-stroke style and a shading-stroke style based on fusion-stroke-training images and real-style-fusion drawings.

Additionally, or alternatively, in some embodiments, the acts 1100 (or the acts 1200) include a step for applying the multi-branch-style-transfer network to generate a style-fusion image exhibiting the edge-stroke style and the shading-stroke style based on a source image. For instance, the algorithms and acts described in reference to FIG. 4B can comprise the corresponding acts for performing a step for applying the multi-branch-style-transfer network to generate a style-fusion image exhibiting the edge-stroke style and the shading-stroke style based on a source image.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 13:
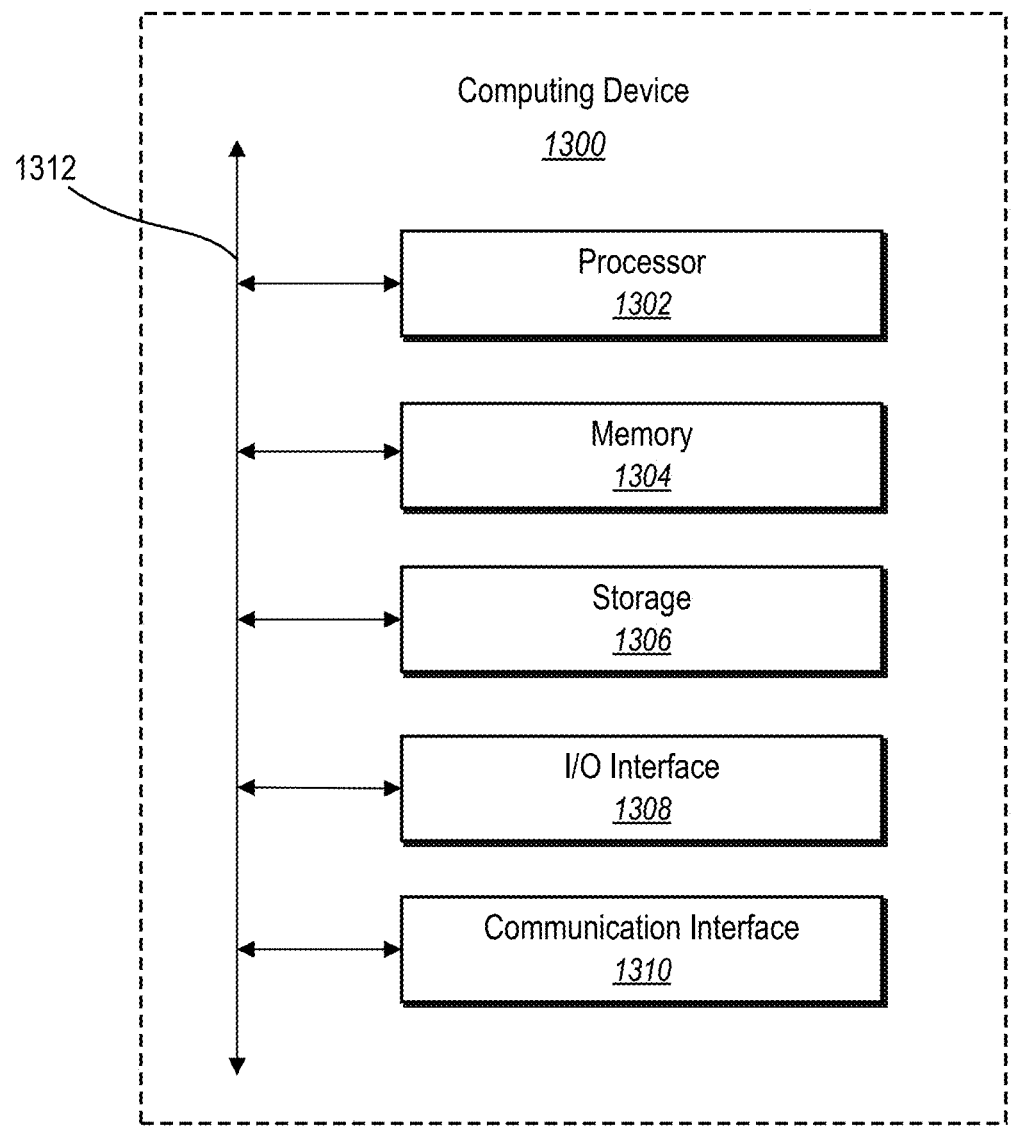
FIG. 13 illustrates a block diagram of an exemplary computing device for implementing one or more embodiments of the present disclosure.

FIG. 13 illustrates a block diagram of exemplary computing device 1300 that may be configured to perform one or more of the processes described above. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for digitizing real-world objects, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions related to object digitizing processes (e.g., digital scans, digital models).

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example and not by way of limitation, the communication interface 1310 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computer system to:

generate, utilizing a non-photorealistic-rendering ("NPR") generator corresponding to a style-transfer-neural network, a simplified image of a source image, the simplified image depicting NPR features extracted from the source image and the source image exhibiting a stroke style;

extract, utilizing an encoder of the style-transfer-neural network, a feature map from the simplified image depicting NPR features extracted from the source image; and generate, utilizing a decoder of the style-transfer-neural network, a stylized-stroke image corresponding to the source image and exhibiting the stroke style by decoding the feature map.

2. The non-transitory computer readable medium of claim 1, further comprising instructions that, when executed by the at least one processor, cause the computer system to:

receive an indication of a user selection of a stroke-style setting corresponding to the stroke style from among a first stroke-style setting and a second stroke-style setting; and based on receiving the indication of the user selection of the stroke-style setting, generate the stylized-stroke image exhibiting the stroke style.

3. The non-transitory computer readable medium of claim 1, wherein the stoke style comprises one of pencil, woodcut, ink, crayon, or charcoal.

4. The non-transitory computer readable medium of claim 1, wherein the instructions, when executed by the at least one processor, cause the computer system to:

receive an indication of a user selection of a shading-style setting corresponding to a shading-stroke style from among a first shading-style setting and a second shading-style setting; and generate the stylized-stroke image exhibiting the stroke style by generating a stylized-shading image comprising shading exhibiting the shading-stroke style based on receiving the indication of the user selection of the shading-style setting.

5. The non-transitory computer readable medium of claim 4, wherein the shading-stroke style comprise one of lines, crossed, smudge, or stippling.

6. The non-transitory computer readable medium of claim 1, wherein:

the style-transfer-neural network comprises an edge-style-transfer-neural network trained to generate stylized-edge images exhibiting an edge-stroke style;

the decoder of the style-transfer-neural network comprises a decoder of the edge-style-transfer-neural network;

the stroke style comprises the edge-stroke style; and the instructions, when executed by the at least one processor, cause the computer system to generate the stylized-stroke image by generating, utilizing the decoder of the edge-style-transfer-neural network, a stylized-edge image corresponding to the source image, the stylized-edge image comprising edges exhibiting the edge-stroke style.

7. The non-transitory computer readable medium of claim 1, wherein:

the style-transfer-neural network comprises a shading-style-transfer-neural network trained to generate stylized-shading images exhibiting a shading-stroke style;

the decoder of the style-transfer-neural network comprises a decoder of the shading-style-transfer-neural network;

the stroke style comprises the shading-stroke style; and the instructions, when executed by the at least one processor, cause the computer system to generate the stylized-stroke image by generating, utilizing the decoder of the shading-style-transfer-neural network, a stylized-shading image corresponding to the source image, the stylized-shading image comprising shading exhibiting the shading-stroke style.

8. The non-transitory computer readable medium of claim 7, further comprising instructions that, when executed by the at least one processor, cause the computer system to:
   generate, utilizing an additional NPR generator, an additional simplified image of the source image;
   based on the additional simplified image, generate, utilizing an edge-style-transfer-neural network, a stylized-edge image corresponding to the source image and comprising edges exhibiting an edge-stroke style;
   generate, utilizing a style-fusion-neural network, a fusion map for synthesizing stroke styles from the stylized-edge image and the stylized-shading image; and
   based on the fusion map, generate a style-fusion image comprising the edges exhibiting the edge-stroke style and the shading exhibiting the shading-stroke style.

9. The non-transitory computer readable medium of claim 1, further comprising instructions that, when executed by the at least one processor, cause the computer system to generate the simplified image depicting NPR features extracted from the source image by:
   generating the simplified image comprising edge depictions from the source image utilizing an extended difference-of-gaussians operator; or
   generating the simplified image comprising a contrast abstraction from the source image utilizing an objective-abstraction function.

10. The non-transitory computer readable medium of claim 1, wherein the source image comprises a natural photograph.

11. The non-transitory computer readable medium of claim 1, further comprising instructions that, when executed by the at least one processor, cause the computer system to train the style-transfer-neural network by:
   generating, utilizing the NPR generator, a simplified-training image of a stroke-training image exhibiting the stroke style;
   extracting, utilizing the encoder of the style-transfer-neural network, a training-feature map from the simplified-training image;
   based on the training-feature map, generating, utilizing the decoder of the style-transfer-neural network, a stylized-stroke-sample image exhibiting the stroke style;
   determining an adversarial loss using an adversarial-loss function based on a discriminator-neural network comparing the stylized-stroke-sample image and a real-stroke drawing;
   determining a reconstruction loss from a reconstruction-loss function based on a comparison of the stylized-stroke-sample image and the stroke-training image; and
   adjusting network parameters of the style-transfer-neural network based on the determined adversarial loss and the determined reconstruction loss.

12. The non-transitory computer readable medium of claim 11, wherein:
   the style-transfer-neural network comprises an edge-style-transfer-neural network, the decoder of the style-transfer-neural network comprises a decoder of the edge-style-transfer-neural network, the stroke style comprises an edge-stroke style, and the stroke-training image comprises an edge-stroke-training image; and
   the instructions, when executed by the at least one processor, cause the computer system to:
      generate the simplified-training image of the stroke-training image by generating, utilizing the NPR generator, the simplified-training image comprising edge depictions from the edge-stroke-training image; and
      generate the stylized-stroke-sample image by generating, utilizing the decoder of the edge-style-transfer-neural network, a stylized-edge-sample image exhibiting the edge-stroke style.

13. The non-transitory computer readable medium of claim 11, wherein:
   the style-transfer-neural network comprises a shading-style-transfer-neural network, the decoder of the style-transfer-neural network comprises a decoder of the shading-style-transfer-neural network, the stroke style comprises a shading-stroke style, and the stroke-training image comprises a shading-stroke-training image; and
   the instructions, when executed by the at least one processor, cause the computer system to:
      generate the simplified-training image of the stroke-training image by generating, utilizing the NPR generator, the simplified-training image comprising a contrast abstraction from the shading-stroke-training image; and
      generate the stylized-stroke-sample image by generating, utilizing the decoder of the shading-style-transfer-neural network, a stylized-shading-sample image exhibiting the shading-stroke style.

14. A system comprising:
   at least one processor;
   at least one non-transitory computer readable medium comprising a first non-photorealistic-rendering ("NPR") generator, an edge-style-transfer-neural network, a second NPR generator, a shading-style-transfer-neural network, and a style-fusion-neural network; and
   instructions that, when executed by at least one processor, cause the system to:
      generate a stylized-edge image corresponding to a source image and comprising edges exhibiting an edge-stroke style by utilizing the first NPR generator to generate a first simplified image comprising edge depictions from the source image and providing the first simplified image to the edge-style-transfer-neural network;
      generate a stylized-shading image corresponding to the source image and comprising shading exhibiting a shading-stroke style by utilizing the second NPR generator to generate a second simplified image comprising a contrast abstraction from the source image and providing the second simplified image to the shading-style-transfer-neural network;
      generate a fusion map for synthesizing stroke styles from the stylized-edge image and the stylized-shading image utilizing the style-fusion-neural network; and
      based on the fusion map, generate a style-fusion image comprising the edges exhibiting the edge-stroke style and the shading exhibiting the shading-stroke style.

15. The system of claim 14, further comprising instructions that, when executed by the at least one processor, cause the system to:
- receive an indication of a user selection of an edge-style setting corresponding to the edge-stroke style from among a first edge-style setting and a second edge-style setting; and
- based on receiving the indication of the user selection of the edge-style setting, generate the stylized-edge image comprising edges exhibiting the edge-stroke style.

16. The system of claim 14, further comprising instructions that, when executed by the at least one processor, cause the system to:
- receive an indication of a user selection of a shading-style setting corresponding to the shading-stroke style from among a first shading-style setting and a second shading-style setting; and
- based on receiving the indication of the user selection of the shading-style setting, generate the stylized-shading image comprising shading exhibiting the shading-stroke style.

17. The system of claim 14, wherein the edge-style-transfer-neural network comprises an encoder and a decoder, the system further comprising instructions that, when executed by the at least one processor, cause the system to generate the stylized-edge image by:
- extracting a feature map from the first simplified image utilizing the encoder of the edge-style-transfer-neural network; and
- generating the stylized-edge image corresponding to the source image and comprising edges exhibiting the edge-stroke style by decoding the feature map utilizing the decoder of the edge-style-transfer-neural network.

18. The system of claim 14, wherein the shading-style-transfer-neural network comprises an encoder and a decoder, the system further comprising instructions that, when executed by the at least one processor, cause the system to generate the stylized-shading image by:
- extracting a feature map from the second simplified image utilizing the encoder of the shading-style-transfer-neural network; and
- generating the stylized-shading image corresponding to the source image and comprising shading exhibiting the shading-stroke style by decoding the feature map utilizing the decoder of the edge-style-transfer-neural network.

19. The system of claim 14, wherein the style-fusion-neural network comprises a first encoder, a second encoder, and a decoder, the system further comprising instructions that, when executed by the at least one processor, cause the system to generate the fusion map for synthesizing the stroke styles from the stylized-edge image and the stylized-shading image by:
- extracting a first feature map from the stylized-edge image utilizing the first encoder of the style-fusion-neural network;
- extracting a second feature map from the stylized-shading image utilizing the second encoder of the style-fusion-neural network;
- concatenating the first feature map and the second feature map to generate a concatenated feature map; and
- based on the concatenated feature map, generating the fusion map for synthesizing the stroke styles from the stylized-edge image and the stylized-shading image utilizing the decoder of the style-fusion-neural network.

20. A computer-implemented method for training and applying multi-branch-style-transfer networks with embedded non-photorealistic-rendering ("NPR") generators to generate style-fusion images comprising:
- performing a step for training a multi-branch-style-transfer network to generate style-fusion-sample images exhibiting an edge-stroke style and a shading-stroke style; and
- performing a step for applying the multi-branch-style-transfer network to generate a style-fusion image exhibiting the edge-stroke style and the shading-stroke style based on a source image.

* * * * *